US012705694B2

(12) United States Patent
Bronder

(10) Patent No.: US 12,705,694 B2
(45) Date of Patent: Aug. 11, 2026

(54) GENERATING SUPER-RESOLUTION TRAINING DATA WITH PAIRINGS OF ORIGINAL AND DERIVATIVE IMAGES

(71) Applicant: Microsoft Technology Licensing, LLC, Redmond, WA (US)

(72) Inventor: Matthew Lawrence Bronder, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 18/680,458

(22) Filed: May 31, 2024

(65) Prior Publication Data

US 2025/0371662 A1 Dec. 4, 2025

(51) Int. Cl.
*G06T 3/4053* (2024.01)
*G06T 5/60* (2024.01)

(52) U.S. Cl.
CPC .............. *G06T 3/4053* (2013.01); *G06T 5/60* (2024.01); *G06T 2207/20016* (2013.01); *G06T 2207/20081* (2013.01)

(58) Field of Classification Search
CPC ..................... G06T 3/4053; G06T 5/60; G06T 2207/20016; G06T 2207/20081; G06T 2207/20084
See application file for complete search history.

(56) References Cited

U.S. PATENT DOCUMENTS

2020/0013155 A1* 1/2020 Putman ................ G06V 10/993
2021/0150669 A1* 5/2021 Potapov ................ G06T 3/4053
2023/0360174 A1* 11/2023 Delattre ................... G06N 3/04

OTHER PUBLICATIONS

International Search Report and Written Opinion received for PCT Application No. PCT/US2025/020782, May 14, 2025, 15 pages.

Li, et al., "Optical image super-resolution in dark underwater background via SwinIR", Fourteenth International Conference on Information Optics and Photonics (CIOP 2023), vol. 12935, Nov. 24, 2023, 06 Pages.

* cited by examiner

*Primary Examiner* — Iriana Cruz
(74) *Attorney, Agent, or Firm* — Workman Nydegger

(57) ABSTRACT

Systems and methods are provided for obtaining and using training data for training a super-resolution model that transforms images from a first-low resolution to a second-high resolution. The methods include generating high-fidelity high-resolution images for the training data from underlying images at the second-high resolution and that have a relatively lower fidelity. The high-fidelity high-resolution images are paired with correlating low-resolution images and used to train the super-resolution model.

20 Claims, 15 Drawing Sheets

GENERATING SUPER-RESOLUTION TRAINING DATA WITH PAIRINGS OF ORIGINAL AND DERIVATIVE IMAGES

BACKGROUND

With conventional image processing, it is possible to render images at a variety of display resolutions. This is particularly beneficial for enabling content that is saved at one resolution to be rendered at different resolutions on a plurality of different display devices having different display capabilities. For example, images that are saved at low resolutions can be upscaled to higher resolutions for display on high-resolution displays.

The upscaling of images is sometimes referred to as super-resolution processing. With super-resolution processing, a higher resolution image of a base image is generated by rendering the base image with a higher pixel density than the underlying base image. For example, a base image having a 2K resolution (1920×1080 pixel resolution) can be upscaled to a 4K resolution image (3840×2160 pixel resolution) by converting each of the pixels in the base image into four new upscaled pixels.

Super-resolution processes utilize specialized algorithms that are configured to generate outputs comprising new details for the newly upscaled pixels, which are not present in the underlying pixels, and such that the new upscaled pixels are not mere duplicates of the underlying base pixels from which they depend. By way of example, each of the new pixels in an upscaled image will usually contain a unique set of properties that are derived from some combination of the underlying base pixels' properties, as well as the properties of the neighboring pixels that are contained within the base image and, in some instances, the new pixel properties will also be based at least in part on the properties of other new neighboring pixels of the upscaled image.

Many different types of super-resolution algorithms and techniques can be used to upscale and enhance an image. For instance, some super-resolution processes can be used to smooth out the edges of the new pixels that are being generated. Some super-resolution processes can also be used to cause the final upscaled images to appear more detailed than the underlying images from which they are based. The super-resolution model algorithms can be tuned for different desired outcomes and styles by controlling algorithm weights applied to control variables or parameters of the algorithms that are based on attributes of the images being processed.

Recent developments in computer technologies include the creation of machine learning models that can be trained to perform various tasks, including upscaling and other forms of super-resolution image processing. Super-resolution machine learning models, for example, can be configured with one or more of the super-resolution processing algorithms that are trained to perform super-resolution processing on a particular type or class of lower-resolution images by applying the models to training data that comprises pairs of low-resolution and high-resolution images and in such a manner as to consistently generate images of a high-resolution based on inputs comprising low-resolution images, similar to the training data.

The use of super-resolution models for assisting with image upscaling is particularly helpful in the gaming industry since many gaming engines are configured to produce initial image outputs that are oftentimes generated at initial resolutions that are lower than the high-resolution displays where the gaming content is rendered.

The more training that the super-resolution models undergo for different end-use scenarios (e.g., desired upscaling, image formatting, image rendering styles), the better the models can perform in generating the desired outputs during runtime. Because different gaming systems are configured to process images with different styles and formats, the super-resolution models need to be trained with training data that is similar to the image content that will be processed by the different gaming systems for each end-use scenario.

Unfortunately, it can be difficult to obtain high-quality training data for super-resolution processing, particularly for all of the different end-use scenarios. Accordingly, any improvements in the manner in which high-quality training data can be obtained for training machine learning models are desired.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include techniques for generating and using training data and for training machine learning models that are configured for performing super-resolution image processing.

Systems and methods are provided for obtaining and using training data for training a super-resolution model that transforms images from a first-low resolution to a second-high resolution. The methods include deriving high-fidelity high-resolution images at the second-high resolution for the training data based on underlying high-resolution images that have a relatively lower fidelity than the derived high-fidelity high-resolution images. The high-fidelity high-resolution images are paired with correlating low-resolution images and used to train the super-resolution model.

In some aspects, the techniques described herein relate to a method for generating training data for training a super-resolution model, the method including: identifying a first super-resolution model that is to be trained to transform low-resolution input images having a first resolution into high-resolution output images having a second resolution that is higher than the first resolution; identifying a second super-resolution model trained to transform high-resolution input images having the second resolution into super-high-resolution output images having a third resolution that is higher than the second resolution; obtaining an initial set of high-resolution images having the second resolution; obtaining a correlating set of low-resolution images that correlate with the initial set of high-resolution images; applying the second super-resolution model to the initial set of high-resolution images to obtain a set of super-high-resolution images having the third resolution; generating a set of high-fidelity high-resolution images having the second resolution by downsampling the set of super-high-resolution images from the third resolution to the second resolution, the set of high-fidelity high-resolution images having a second image fidelity that is greater than a first image fidelity of the initial set of high-resolution images; and pairing the set of high-fidelity high-resolution images with the correlating set of low-resolution images as training data for training the super-resolution model.

In some aspects, the techniques described herein relate to a computing system including: a hardware processing system including a hardware processor; and one or more storage devices storing executable instructions that are executed by the hardware processing system for causing the computing system to perform operations for implementing the methods described herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
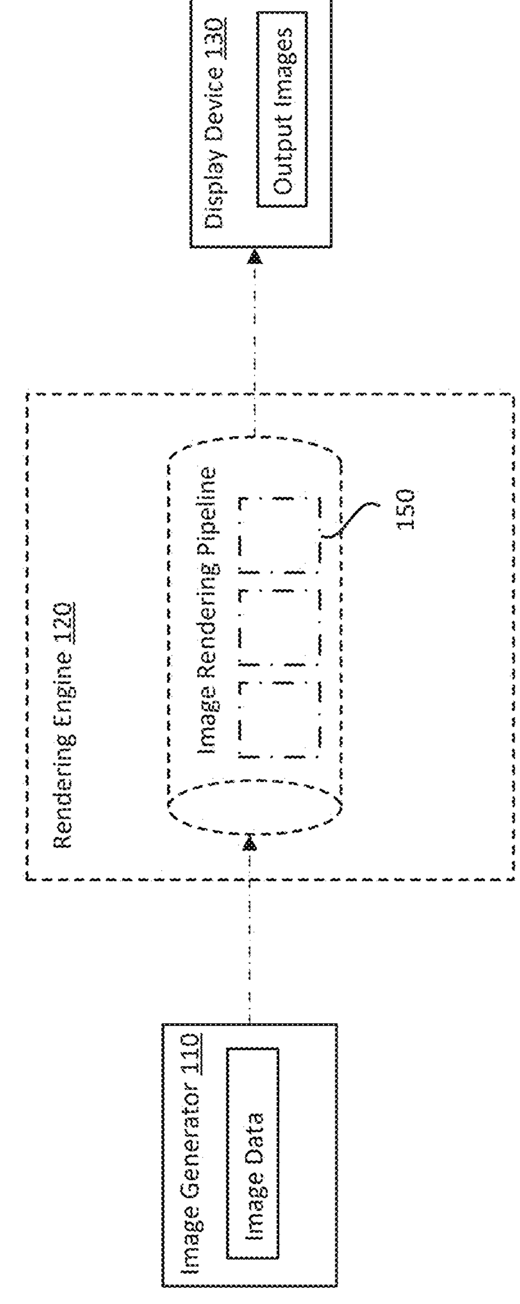
FIG. 1 illustrates an example of an image processing flow associated with the generation of images from an image generator.

As noted above, the disclosed embodiments include methods and systems for generating and using training data for training super-resolution models, wherein the training data comprises correlating image pairings, where each correlating image pair or pairing comprises a low-resolution image and a corresponding high-resolution image depicting the same image frame or scene.

The image pairings are generated, in some embodiments, by modifying an image generator that was initially configured to generate image output in only a single resolution at a time. The modification to the image generator enables the substantially simultaneous generation of two sets of images in different resolutions. The substantially simultaneous generation of the two sets of images may occur at exactly the same periods of time or, alternatively, at different periods of time that are at least partially overlapping, such as with parallel processing by the image generator and wherein both sets of images at different resolutions are still based on the same shared content (e.g., scenes or frames).

The two sets of images can then be paired together into training data. In particular, a low-resolution image and a corresponding high-resolution image for a plurality of different frames of image data are paired together as training data for training a super-resolution model. The paired images can include all image data that is generated (e.g., low-resolution and high-resolution images for each of the plurality of different frames) or, alternatively, for only a subset of the image data that is generated (e.g., low-resolution and high-resolution images for only some of the plurality of the different frames generated). Additionally, the paired image data can include the entirety of the paired low-resolution and high-resolution images, or alternatively, only limited corresponding sub-portions of the paired low-resolution and high-resolution images.

The high-resolution images of the training data can also be modified and/or replaced by corresponding high-fidelity high-resolution images that are derived from the high-resolution images before being paired with the correlating low-resolution images. In these embodiments, the derived high-fidelity high-resolution images have a higher fidelity than their underlying high-resolution images.

The super-resolution models are trained by applying the super-resolution models to the training data. With this training, the super-resolution models are tuned to generate high-resolution images, with resolutions that are the same as or similar to the high-resolution images in the image pairings having the same quality or resolution attribute, based on new input low-resolution images, with resolutions that are the same as or similar to the low-resolution images in the image pairings. The models can also be trained with this training data to output high-resolution images at a target resolution having a higher fidelity than the fidelity of the high-resolution images that are natively generated by a game engine at the same resolution, for example, as will be described in more details below.

References to images having the same or similar resolutions mean that the resolutions have the same or similar sharpness, clarity, and/or pixel density. If the resolutions are the same, for example, then they are identical (i.e., they have identical sharpness, clarity, and/or pixel density). If the resolutions are similar, then then the sharpness, clarity, and/or pixel density of one resolution is within 99%, 98%, 97%, 96%, 95%, between 95%-90%, between 85%-80% of the corresponding sharpness, clarity and/or pixel density of the comparable resolution. In some cases, the term "image resolution" refers to the number of pixels in an image such that higher-resolution images have more pixels than lower-resolution images.

The term fidelity, as used herein and as described in more detail below, is a relative term referring to how accurately a raster image represents the details and quality of the original vector graphics that are pixilated within the raster representations of the original vector graphics.

One benefit of generating and utilizing training data according to the current embodiments is that it facilitates embodiments in which high-resolution images can be rendered during runtime (e.g., when a game is being executed by a game engine) without negatively impacting the performance of the game engine. Typically, the performance of a game engine can be negatively impacted during gameplay when the game engine is required to generate images at a very high resolution.

By offloading the processing required to render the high-resolution images to another component, such as the disclosed super-resolution models, the game engine can be set to output low-resolution images that have a minimal processing burden on the game engine. The disclosed super-resolution models are correspondingly trained to transform the low-resolution images into the desired high-resolution images, such that the transformation of the low-resolution images into the high-resolution images during runtime can be performed very inexpensively and efficiently. It is also possible to render high-resolution images having a higher fidelity than the images that are natively generated by the game engine during the gameplay, based on the transformations performed by the super-resolution model trained with training data comprising high-fidelity high-resolution images that are derived from the natively generated high-resolution images of the game engine independently of the gameplay.

As noted above, and as described in more details with reference to the disclosure related to FIGS. 1-9, the disclosed embodiments include instances in which an imaging engine that is used to generate images for a software product (e.g., a video game or other software application) is modified to generate correlating training data of images rendered during runtime of that product (e.g., video game or other software application). In these instances, the imaging engine is typically not integrated into the software package containing the video game. Instead, the imaging engine may be modifiable without having to modify code used to execute the video game.

Unfortunately, there are some instances in which a video game may be integrated into or with the imaging engine to such a degree that it is not possible to easily modify the imaging engine to generate the correlating images used for training data. Accordingly, if an entity desires to obtain training data for training a super-resolution model to transform the images of the video game from a first resolution to high-resolution images of the video game that is integrated into the imaging engine, it may require additional work to modify the integrated code of the game and imaging engine, to generate and scrape the outputs at multiple viewports of the imaging engine. For at least this reason, it would be desirable to provide improved techniques for obtaining training data for games and other software applications that are packaged with integrated imaging engines.

As further described with reference to FIGS. 10-12, the following disclosure also includes embodiments for obtaining and utilizing training data for training super-resolution models that generate high-resolution images for a target software application, also referred to herein as a target product, when the target product is packaged with a first integrated image generator that renders images at a first and relatively lower resolution, but in which it may not be possible or easy to modify the integrated imaging engine that is packaged with the target product.

Figure 10:
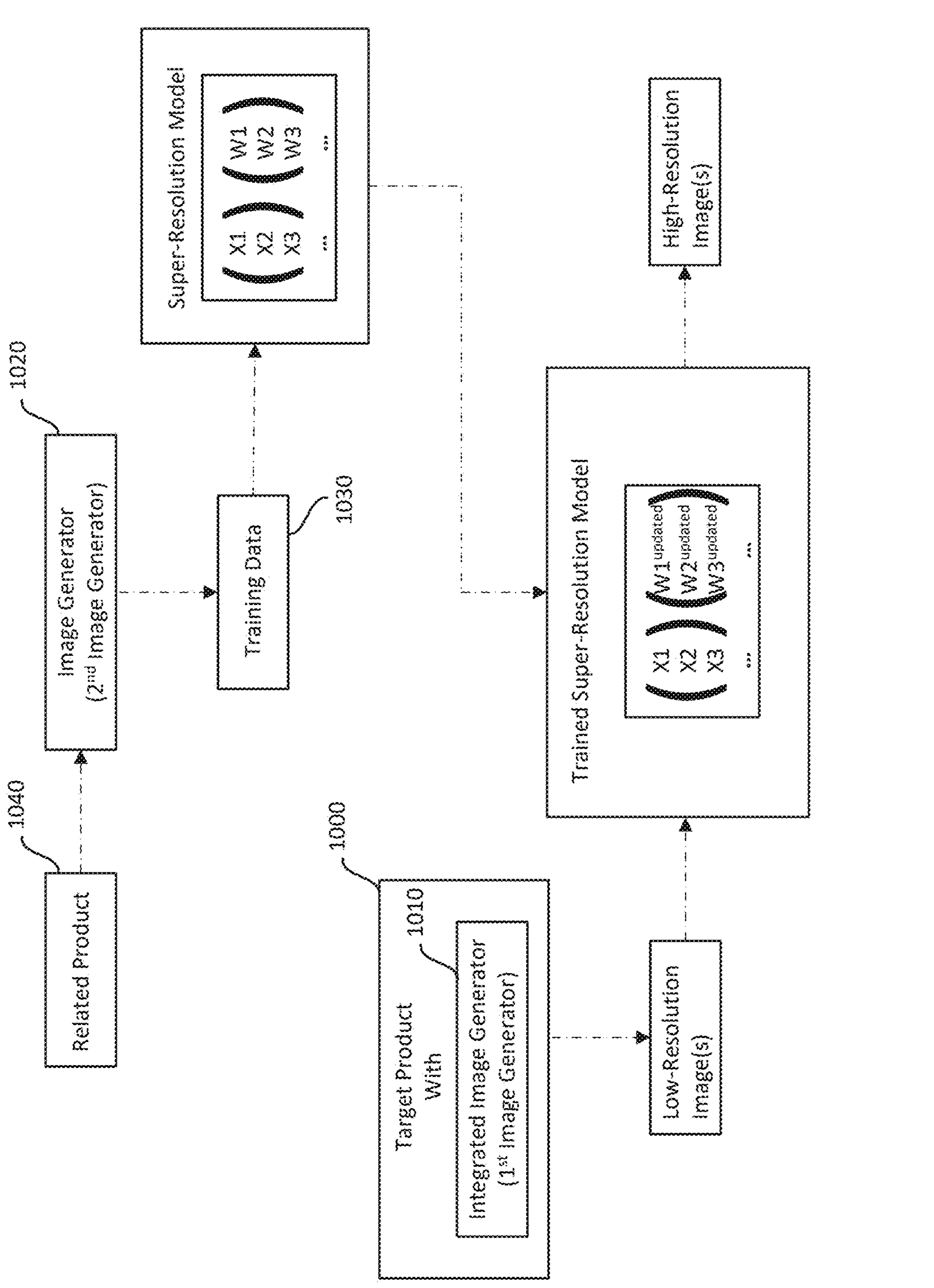
FIG. 10 illustrates an example of a processing flow associated with generating and utilizing training data sets.
Figure 11:
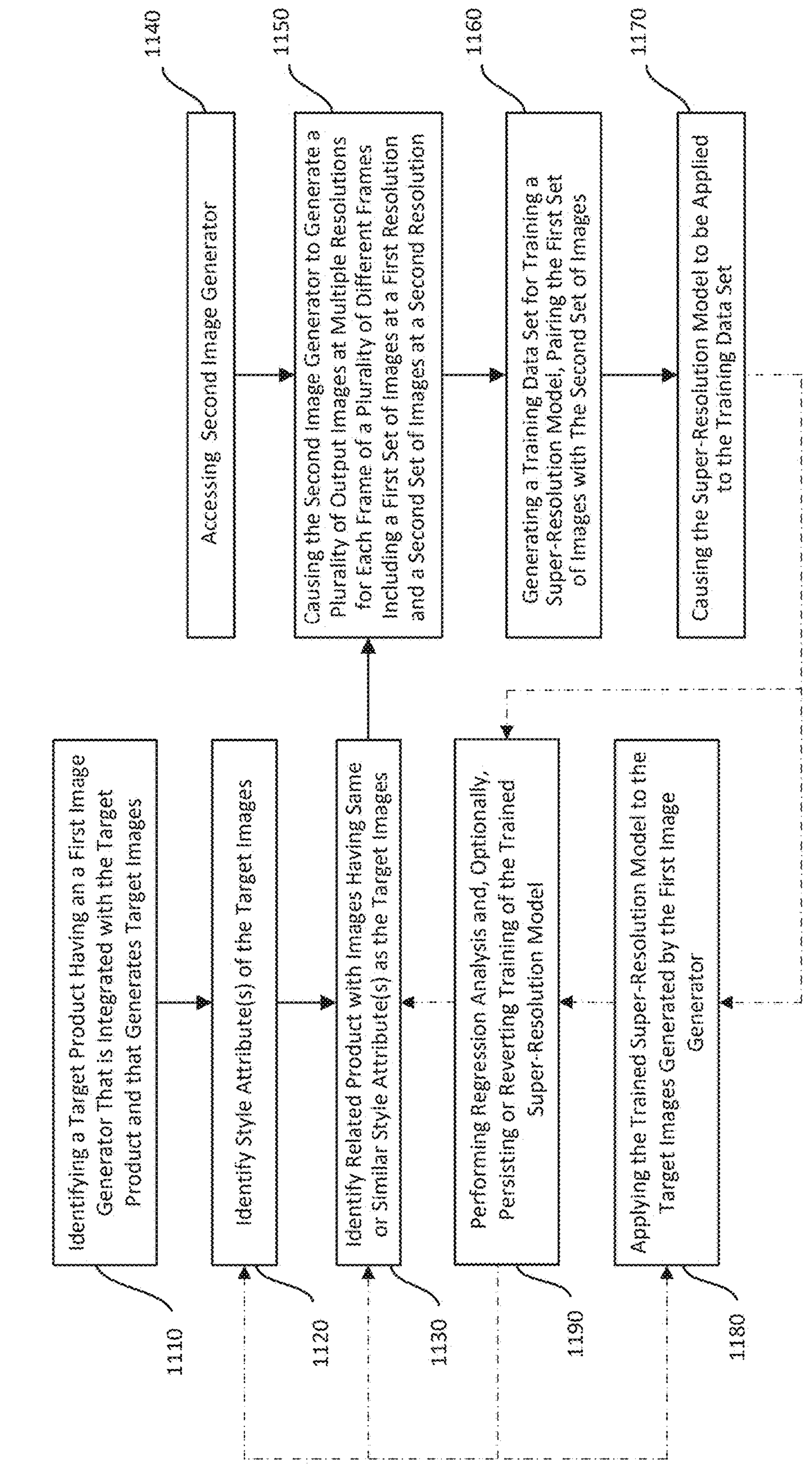
FIG. 11 illustrates an example of a flow diagram of acts associated with methods for generating training data sets and for generating trained super-resolution models by applying super-resolution models to the training data sets.
Figure 12:
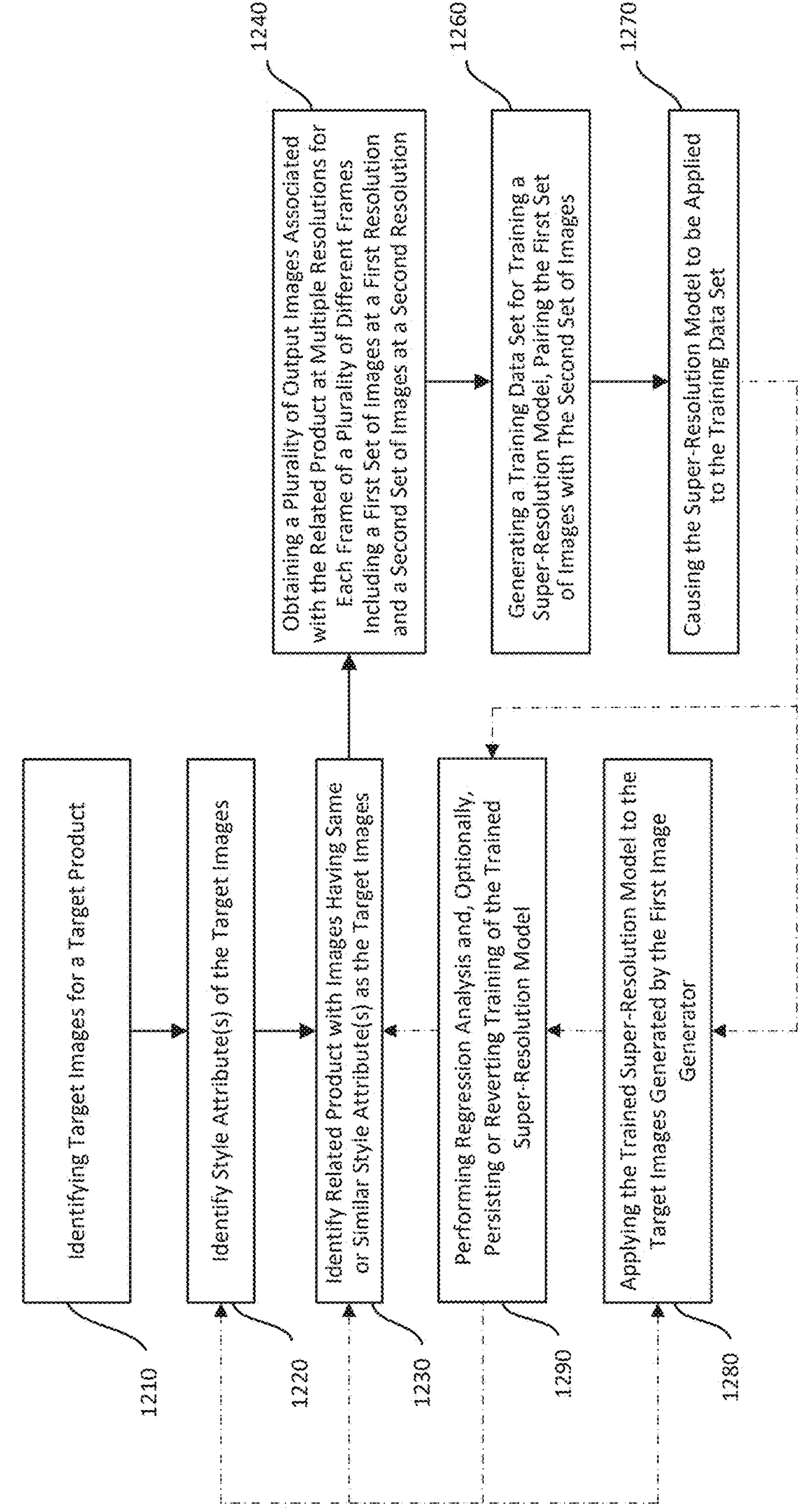
FIG. 12 illustrates another example of a flow diagram of acts associated with methods for generating training data sets and for generating trained super-resolution models by applying super-resolution models to the training data sets.

These additional embodiments described in FIGS. 10-12 include methods and systems for (i) identifying style attributes of images for the target product(s) that are generated by the first image generator(s) integrated with the target product(s) and which images are generated at a first resolution that is relatively lower than second and higher resolution images rendered by a super-resolution model applied to the low-resolution images and, next, (ii) by finding similar products or software applications (e.g., demos of the target video game) that are used to generate images having the same or similar style attributes at the first and relatively lower resolution, and then (iii) by modifying a second or different image engine that is not integrated with the target product (e.g., video game) to generate training data comprising correlating pairs of low-resolution and high-resolution images from the similar product(s), and then (iv) by applying the super-resolution model to that training data. In this manner, the trained super-resolution model is trained to generate high-resolution images that correlate to the relatively lower-resolution images that are generated by the first image generator(s) that are integrated with the target product(s).

Attention is now directed to FIG. 1. As shown, an image processing flow 100 includes an image generator 110 processing image data that is fed through an image rendering pipeline of a rendering engine 120 for preparing output images configured for rendering on a display device 130 with a desired format and at a desired resolution.

The image data may comprise actual images that are created by the image generators. In some instances, for example, the image generator is a gaming engine that executes a game simulation or other application execution that generates image data structures that define attributes and properties of the images to be generated. Additionally, or alternatively, the image generators can generate visualizations of the image data that are rendered on a connected display device.

The rendering engine 120 may be a stand-alone software module that utilizes hardware, such as a graphics processing unit (GPU) or other hardware components. The rendering engine 120 may be integrated into the image generator (e.g., gaming engine) and/or display device and/or an intermediary system interposed between the image generator and end-user display device.

The processes performed by the rendering engine 120 may include various discrete processes for altering the attributes of the images being processed. By way of example, the image rendering pipeline of the rendering engine 120 may include image processing such as processing that modifies or applies a particular style, format, orientation, coloring, contrast, brightness, filtering, masking and/or other imaging transformation to the images being processed.

One of the imaging processes that may be performed by the rendering engine 120 is super-resolution processing performed by a super-resolution machine learning model (e.g., super-resolution model 150). The super-resolution model 150 includes algorithms, described below, which are used by the super-resolution model 150 for upscaling a low-resolution image into a high-resolution image. Super-resolution processing that is performed by the super-resolution model 150 may also include other related imaging processes, such as anti-aliasing. A list of examples of super-resolution machine learning models that may be used is: Laplacian Pyramid Super-Resolution network (LapSRN), Fast Super-Resolution Convolutional Neural Network (FSRCNN) and Efficient Sup-Pixel Convolutional Neural Network (ESPCN).

Figure 2:
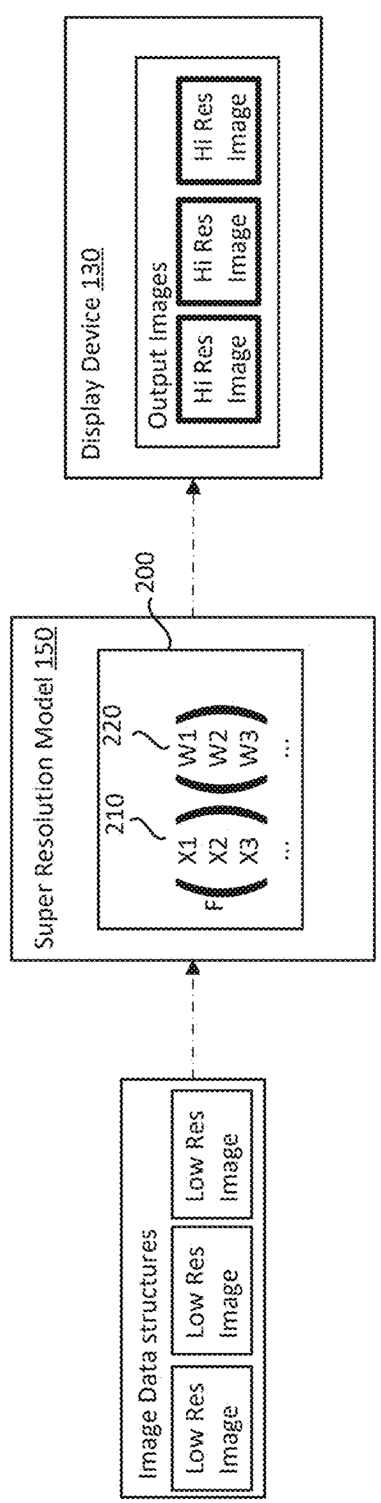
FIG. 2 illustrates an example of a super-resolution processing flow associated with a machine learning model performing super-resolution on low-resolution images to generate corresponding high-resolution images.

FIG. 2 illustrates one example of a super-resolution processing flow in which low-resolution images are upscaled into output images comprising high-resolution images, based on the low-resolution images, and which are prepared for rendering on a display device 130.

As shown, the upscaling is performed by a super-resolution model 150 that comprises a neural network of one or more algorithms 200 that use values of the image attributes and pixel properties as inputs 210 for the algorithm parameters. The neural network of the super-resolution model applies weights 220 to the various inputs 210 to control how the inputs are processed by the neural network algorithms 200. The weights 220 are modified through backpropagation, to account for error values that are detected between the super-resolution model outputs and the high-resolution images included in the training data.

Figure 3:
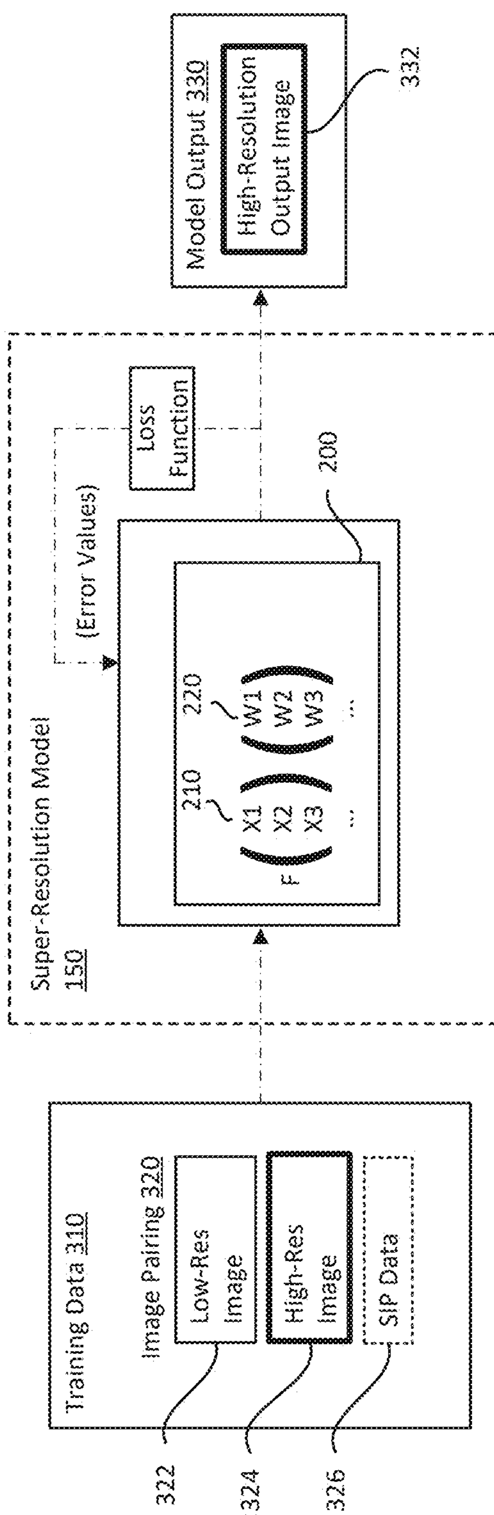
FIG. 3 illustrates an example of a super-resolution training and processing flow of a super-resolution model that is applied to training data comprising low and high-resolution image pairings.

FIG. 3 illustrates a super-resolution training and processing flow 300 in which the super-resolution model 150 is applied to training data 310. The training data includes image pairings 320 of low-resolution images (322) and high-resolution images (324) of the same content (e.g., the same scene or image frame at different resolutions). The training data may also include options for supplemental image processing (SIP) data 326, which will be discussed in more detail below, with reference to FIG. 7, and which can include motion vector data, jittered image data, and other supplemental information. One example of additional supplemental information includes temporal data based on a past frame history, since the value in motion vector data and jittered image data comes from the fusion of a sequence of frames to increase the spatial resolution of the output. A past frame history may be formed from either a set of multiple prior low-resolution images and associated SIP data or from one or more prior high-resolution images output from the super-resolution model.

The supplemental image processing data is available from the image generator. In some instances, the image generator comprises a video codec which processes the images generated by the image generator and as part of the encoding computes motion vector data, jittered image data, depth data, and antialiasing data for the images. This SIP data is used by the super-resolution model, with a low-resolution image, to generate a corresponding high-resolution image that omits aliasing and jitter artifacts that can sometimes exist in the low-resolution images due to discrete rasterization when generating the low-resolution images. By including the SIP data in the training data 310, the super-resolution model 150 is trained to compensate for aliasing effects when comparing the low-resolution image and the high-resolution image in the image pairing 320 supplied with the SIP data.

During training, the super-resolution model 150 is applied to the training data by using the low-resolution images as inputs to the model. Even more particularly, the properties of the low-resolution images are used as input values for the parameters of the model algorithms 200. Weights 220, such as neural network weights, are applied to the model parameters and are adjusted during the training. through backpropagation, to account for error values that are detected between the final model output 330 and the high-resolution images included in the training data (e.g., the differences between the high-resolution output image 332 and the corresponding high-resolution image 324 from the training data image pairing 320).

The weights 220 will continue to be modified as the model is applied to different training data 310, thereby causing the model to proceed along a gradient descent to a desired threshold of convergence in the similarity between the output generated by the model (e.g., high-resolution output image 332) compared to a desired target output (e.g., output represented by high-resolution image 324 in the training data).

Figure 4:
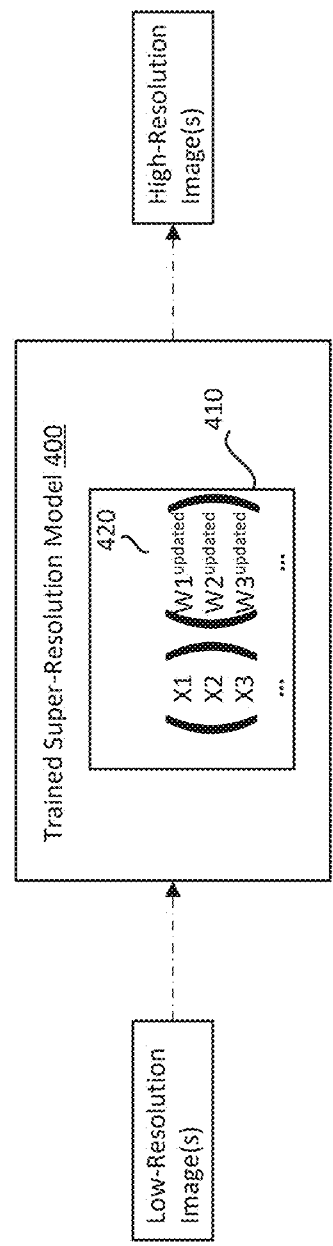
FIG. 4 illustrates an example of a super-resolution processing flow associated with a trained machine learning model performing super-resolution on low-resolution images to generate corresponding high-resolution images.

As a result of the training, the super-resolution model 150 is modified into a trained super-resolution model 400, as shown in FIG. 4, with a modified set of algorithms 410 which are similar to the original algorithms 200 of the untrained super-resolution model, but which have updated weights 420 that cause the trained super-resolution model 400 to perform at an increased level of performance relative to the untrained super-resolution model 150, meaning the high-resolution images are generated more efficiently or more accurately to a desired, target output from the low-resolution images than was possible with the untrained super-resolution model 150. Said another way, the trained super-resolution model 400 has achieved a greater level of convergence associated with the output generated by the trained super-resolution model 400 than the output generated by the untrained super-resolution model 150, when compared to a desired target output.

As noted earlier, one problem with training super-resolution models is obtaining sufficient training data for the different end-use scenarios that a model may be applied to. Some systems for obtaining training data include the creation of two images at different resolutions by taking a first image and then upscaling that image into a second image and then pairing those images together as training data. However, this can be a very time-intensive process.

To help address the foregoing problem, the disclosed systems and techniques include the modification of existing image generators, such as gaming engines, to automatically generate pairs of images at different resolutions.

There are many different types of gaming engines, such as, for example, Unreal Engine™, Amazon Lumberyard™, CryEngine™, Unity, GameMaker: Studio, Incredibuild, and so forth. To generate the images the gaming engine may have a complex 3D mesh model or other model of a scene and objects in the scene. The gaming engine has to render from the complex 3D mesh model to compute the images which is a resource intensive task.

Currently, no conventional gaming engine is being used to generate image training data sets for training super-resolution models to perform upscaling in the manner described herein. In particular, no conventional gaming engine is currently used for generating two sets of images at different resolutions for each frame of a plurality of different frames processed by or generated by the gaming engine and which are paired into image pairings for training data to train a super-resolution model. Other types of rendering engines, beyond gaming engines, have also not been used to generate two sets of images at different resolutions for each frame of a plurality of different frames processed by or generated by the rendering engine and which are paired into image pairings for training data to train a super-resolution model. Instead, conventional gaming engines, and other similar image generators, are configured to merely output images at only a single resolution at a time. While conventional image generators enable a user to select a desired output resolution from multiple different possible output resolutions, they do not enable a user to select multiple different output resolutions to generate, and particularly not for outputting different resolutions of the images having the same or similar content simultaneously.

Conventional gaming engines are configured to only output one resolution of images at a time, with the output images being rendered on a display during game generation or simulation, for example. However, by modifying the code of the gaming engines to output to two different outputs at a time, it is possible to cause the gaming engines to simultaneously output one image at a first resolution and a second image at a second resolution for any selected frames of the image content that is being generated or processed by the gaming engine. Because the images are generated from the same frame they depict the same content, but at different resolutions.

The term gaming engine is a term of art for a type of application that provides many functions related to the generation of games, including animations, physics simulations, audio integration, application interfacing, and image processing. Most gaming engines include or interface with a rendering engine that is configured to process image data (e.g., geometry, viewpoint, texture, lighting, shading, coloring) for generating visualizations or output images corresponding to the image data. For at least this reason, this disclosure will broadly use the term image generator to refer to a gaming engine, rendering engine, or any other application that is configured to generate images from underlying image models. In particular, a rendering engine is an application that generates images from 2D or 3D models configured as scene files containing objects in a strictly defined computer language or data structure. The rendering engine creates image structures from the models and formats the structures as visualizations for rendering on a display. The term "image structure" is used to refer to an image, which can also be defined as a file that stores image data that is rendered into a displayed image by an image viewer.

Some rendering engines are integrated into larger software applications, such as gaming engines, that are configured to not only create the visualizations from the underlying image objects and models but to also create and generate the underlying objects and models. During runtime, the gaming engine also generates animations of output images that are related to gameplay in response to user interactions within a game that is being executed by the gaming engine.

During the generation and simulation of a game or other application by an image generator, images will be generated and output as a plurality of discrete frames in a sequential stream of frames for rendering at a desired framerate (e.g., at a 30 frames per second (FPS)-60 FPS rate). For example, during the runtime of a game, a rendering engine can be used to generate output images that are rendered as animations of the gameplay on a display device. The resolution and framerate in which the images are rendered will be based on the particular resolution and capabilities associated with the display device, as well as the output settings of the rendering engine.

Figure 5:
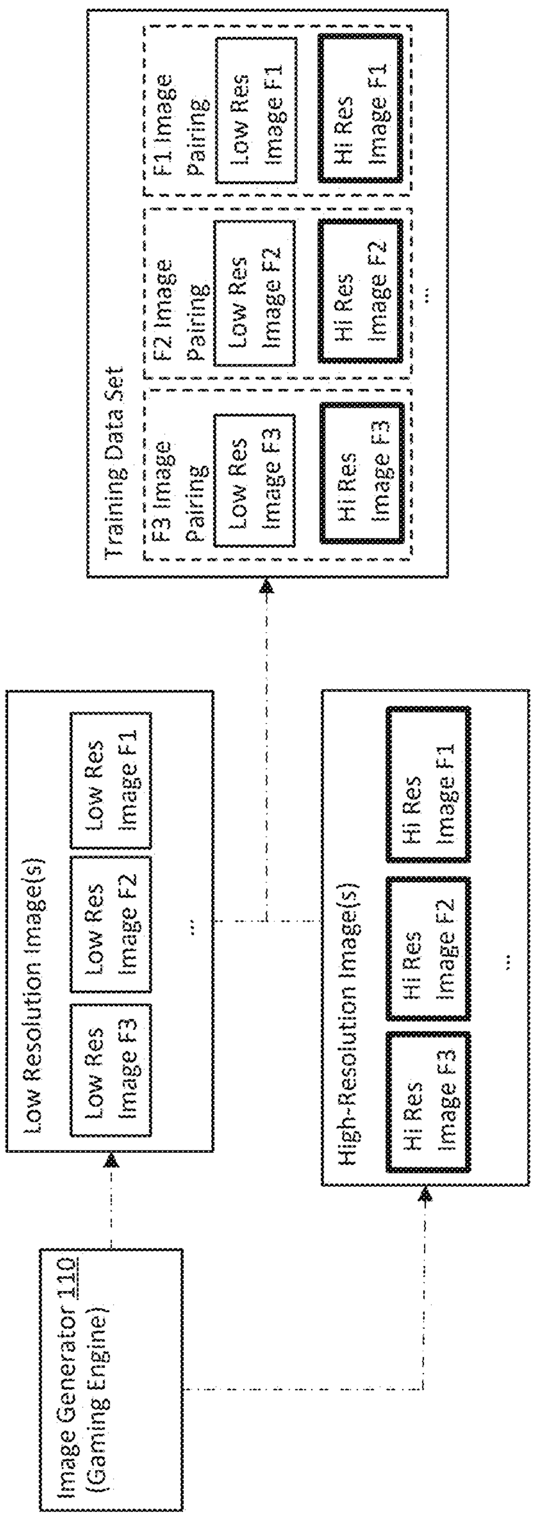
FIG. 5 illustrates an example of a processing flow associated with generating training data sets comprising low and high-resolution image pairings, wherein the high and low-resolution images of the image pairings are generated substantially simultaneously by an image generator.

Attention is now directed to FIG. 5. This illustration shows a training data set generation processing flow 500 in which an image generator 110 (such as a gaming engine) is modified to substantially simultaneously generate two sets of images, including a first set of images at a low-resolution and a second set of images at a high-resolution for each frame of a plurality of frames. The first set of images is generated at a first resolution which is lower than a second resolution. The second set of images is generated at the second resolution. For example, as shown, the image generator 110 generates low-resolution images that include a different low-resolution image for a plurality of frames (e.g., Low-Res Image F1 for frame 1, Low-Res Image F2 for frame 2, Low-Res Image (F3) for frame 3), as well as a different high-resolution image for the same plurality of frames (e.g., High-Res Image F1 for frame 1, High-Res Image F2 for frame 2, High-Res Image (F3) for frame 3).

The system interfacing with or including the image generator 110 is also used to pair the different images together into one or more training data sets of image pairings for training a super-resolution model.

The image pairings of the training data set(s), as previously described, include a low-resolution image and a corresponding high-resolution image pairing for a common frame of image data. By way of example, the illustrated training data set includes an F1 image pairing of the Low-Res Image F1 for frame 1 and the corresponding High-Res Image F1 for frame 1 that were substantially simultaneously generated by the image generator 110. The training data set also includes a plurality of additional image pairings for different frames that are selected from a plurality of sequential frames in a stream of frames being generated by or processed by the image generator.

In some instances, the training data set includes hundreds or thousands or tens of thousands of image pairings to accommodate different needs and preferences for training data sets. It has been found that thousands or tens of thousands of image pairings in a dataset may be sufficient to train a super-resolution model to a desired threshold of convergence. However, the scope of the disclosure is not limited to any particular quantity of image pairings that can be included in a training data set. For instance, it is also possible to generate a training data set of hundreds of thousands of image pairings using the disclosed techniques.

The code of the image generator 110 can be modified to enable the simultaneous generation of the images at different resolutions. New image generators can also be built with the functionality to simultaneously generate images at different resolutions.

With regard to the foregoing, it is noted that the terms low-resolution and high-resolution are relative, such that any resolutions can be used for the different image sets, as long as the resolutions of the image sets are different, with one resolution being higher than the other. In some instances, the low-resolution image set comprises a 2k resolution (i.e., 1920×1080 pixel resolution), or lower, and the high-resolution image set comprises a 4k resolution (i.e., 3840×2160 pixel resolution), or even a higher resolution, such as an 8k resolution.

It will also be appreciated that some super-resolution models are trained to target more than just a single input resolution during inference. By way of example, some models may be created to handle a range of input resolutions and/or for generating multiple output resolutions. This can be particularly beneficial for games that utilize different resolutions at runtime and which may employ dynamic resolution scaling techniques. A game may employ dynamic resolution scaling to adjust its render resolution dynamically based on the GPU load in the scene (e.g., when the GPU is struggling to maintain a given target framerate, such that its resolution will be lowered to reduce the pressure and avoid frame drops).

To train such models, multiple relatively lower-resolution frames are captured for a frame in a correlated manner, and these frames are grouped with their high-resolution ground truth counterparts. So instead of only a correlated pairing, the training processes described herein may produce and consume a correlated plurality of frames that are paired into tuples or other groupings of correlated images for each time step in the training process.

Figure 6:
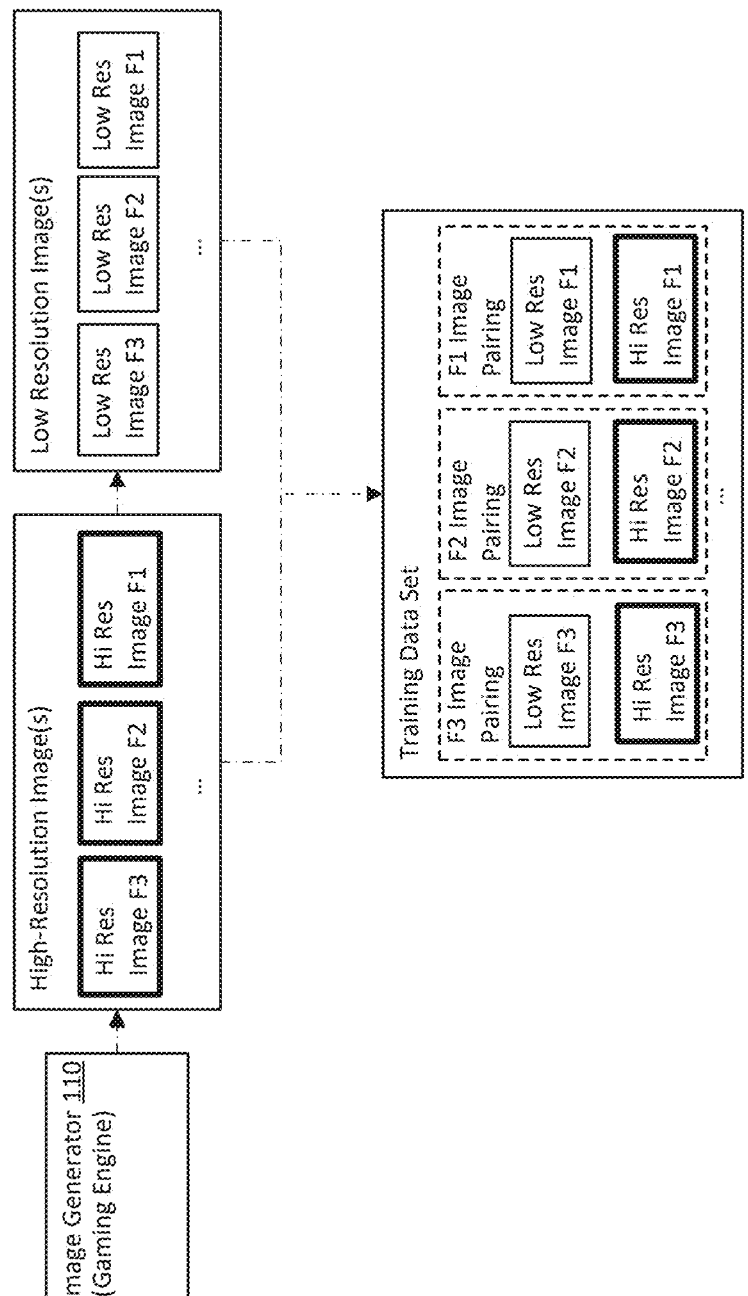
FIG. 6 illustrates an example of a processing flow associated with generating training data sets comprising low and high-resolution image pairings, wherein the high and low-resolution images of the image pairings are generated in series by an image generator.

Attention is now directed to the training data set generation flow 600 of FIG. 6. This flow is enabled by embodiments in which the image generator 110 is capable of operating in a special rendering mode in which the image generator 110 generates correlating frames for different instantiations of a gameplay scene or a repeated simulation at different resolutions, such that frames of the subsequent runs can be correlated at their different resolutions. This may also include generating different frames from different perspectives of the scene.

In this example, the image generator 110 is configured to generate two different sets of images at different resolutions or different image style attributes asynchronously, in series. For example, the image generator 110 can generate a first set of low-resolution images for a plurality of frames during a first run and prior to generating a corresponding second set of high-resolution images for the same plurality of frames during a subsequent execution or simulation of the gameplay. Alternatively, although not shown, the image generator 110 can also generate the set of low-resolution images subsequent to generating the set of high-resolution images.

Regardless of which image data set is generated first, the system interfacing with or incorporating the image generator 110 will pair up the correlating high and low image resolution images for each common frame that is generated by the image generator 110 into the different image pairings of the training data set. For example, the illustrated training data set includes a plurality of image pairings of low and high-resolution images corresponding to common frames.

The pairing of the images can include creating new files or other data structures that include both images, depicting the same content at different resolutions in a single storage location. Alternatively, image pairing may be a pointer data structure that simply references the two images that are handled and stored separately.

Figure 7:
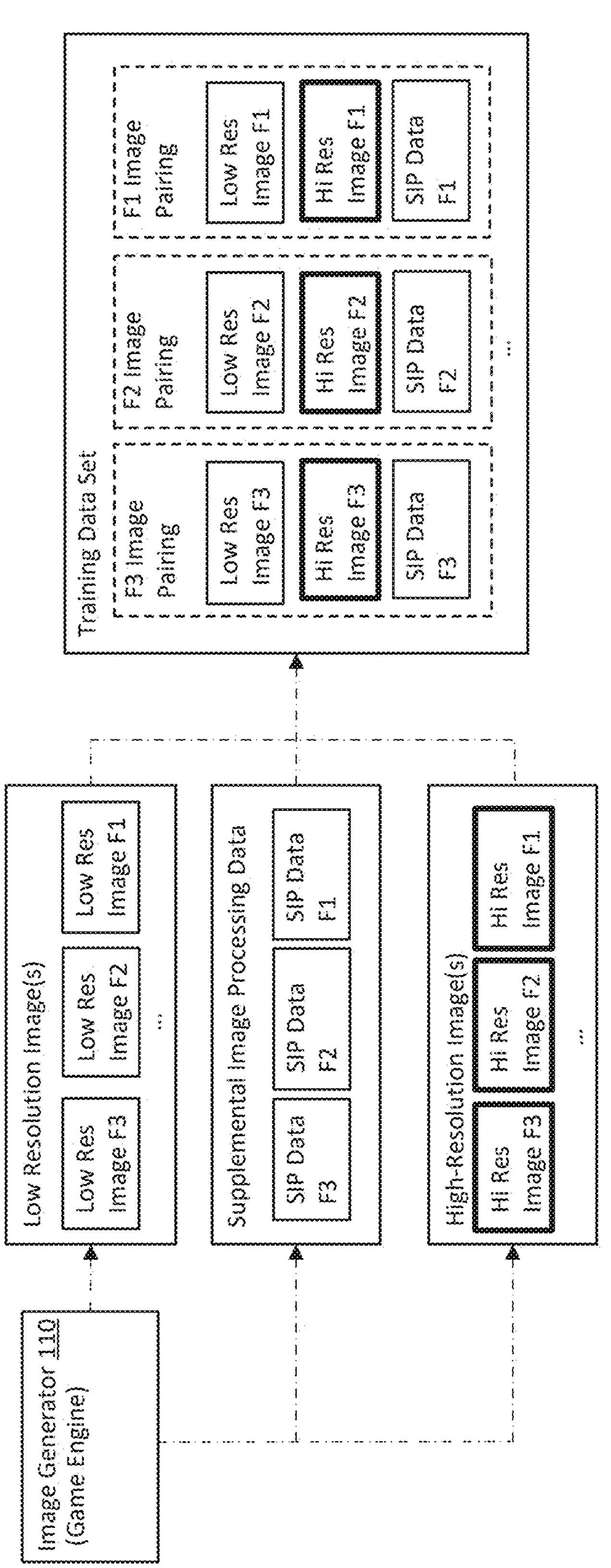
FIG. 7 illustrates an example of a processing flow associated with generating training data sets comprising low and high-resolution image pairings, as well as supplemental image processing data.

Attention is now directed to the training data set generation flow 700 of FIG. 7. This embodiment illustrates how the different training data set image pairings can also be augmented or supplemented with additional imaging data. For example, as shown, the image generator 110 generates supplemental image processing data for one or more of the image frames that are processed and used for the image pairings (e.g., SIP Data F1 for frame 1, SIP Data F2 for frame 2, SIP Data F3 for frame 3, etc.).

The supplemental image processing data that is generated and supplemented with the image pairings can include any image processing data that is usable by a super-resolution model during inference, and which is used while processing the inputs entered as the parameters of the model algorithms. Then, when the model is subsequently used for performing super-resolution processing on low-resolution images to generate high-resolution images, the model can perform the processing with similar supplemental image processing data to obtain final images having a desired quality. By way of example, the supplemental image processing data may include motion vector data, jittered image data, and/or depth data corresponding to the rendering of the low-resolution image set.

The supplemental image processing data may be included as metadata for the lower resolution image, for example, or provided as a separate data file that is referenced by and linked to by the image pairings.

The supplemental image processing data is used by the image generator, in some instances, to modify how the output images are generated. By way of example, MIP bias levels can be set and used with sub-pixel jitter to produce the low-resolution images that comprise sparse sampling of the corresponding higher-resolution images. The MIP biasing increases texture resolution of the image, but at the expense of under-sampling the image data. To compensate, a grouping of sequential undersampled lower-resolution images can be selected and grouped based on the jitter to spatially align contiguous temporal sequences of frames to reconstruct high-resolution frames with full texture detail. In particular, the grouped low-resolution images can then be used with the training data pairings to a corresponding high-resolution image to train the model to reconstruct high-resolution images with full texture detail corresponding to the grouped low-resolution images that comprise sparse samples. While mipmaps or MIP maps are sequences of progressively lower resolution representations of previous images, the MIP bias levels are used to interpolate the texturing differences between different resolution images and can be applied to different algorithms used by the image generator to perform the interpolation.

Other supplemental image processing data that can be used includes anti-aliasing parameters. Anti-aliasing parameters are available from the image generator such as the gaming engine. Antialiasing parameters can be used when performing antialiasing processes, for example, when generating high-resolution outputs that utilize one type of anti-aliasing (e.g., MSAA-Multisample Anti-Aliasing) that better match the anti-aliasing used when generating the expected low-resolution inputs (e.g., FXAA-Fast Approximate Anti-Aliasing). With this training, the model learns to associate, and improve input images generated from a game with less effective game antialiasing with the higher-resolution output based on more effective antialiasing. In this manner, the model can become more adept at smoothing out edges in the high-resolution images.

By way of another example, post-processing effect data, which can be used to perform post-processing (e.g. motion blur) may be included in the generation of both low-resolution and high-resolution outputs. Post-processing effect data is available from the image generator such as the gaming engine. In some instances, the system is trained on training data sets that include supplemental post-processing instructions for performing the post-processing (e.g., motion blur) on output high-resolution images after the super-resolution processes have already been performed and to obtain the high-resolution image that includes attributes of the post-processing (e.g., motion blur). In this regard, it will be appreciated that the image generator and super-resolution model can be modified to apply the post-processing effects during inference or after the super-resolution has already been performed. That said, during the training of the model, it has been found that it is better (i.e., produces a better performing model) to train on non-blurred images (without applying the post-processing effects during inferencing) and to apply blurring (with the post-processing effect data) after the super-resolution processing has been performed.

Figure 8:
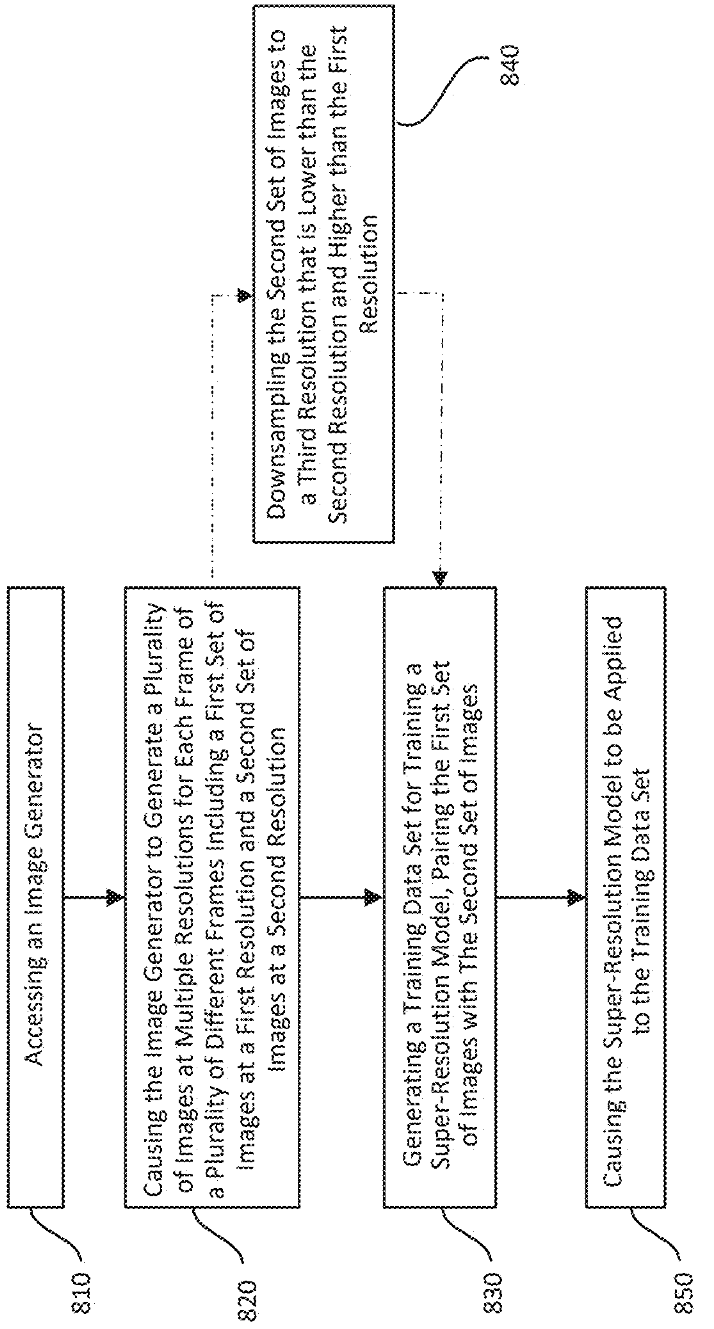
FIG. 8 illustrates an example of a flow diagram of acts associated with methods for generating training data sets and for applying super-resolution models to the training data sets.

Attention is now directed to FIG. 8, which illustrates a flow diagram 800 of a plurality of acts associated with methods for generating and using a super-resolution training data set of image pairings obtained from an image generator such as a gaming engine. The illustrated acts are implemented by a computing system having a processor and storage that stores computer-executable instructions that are executable by the processor to implement the functionality of the referenced acts.

The first illustrated act includes the computing system accessing an image generator (act 810), such as a gaming engine or another type of image generator that is configured to generate images, such as by rendering from a 3D model, by processing image data and that outputs the generated images in a stream of sequential frames at a resolution. The image generator may be integrated into a part of the computing system or, alternatively, remotely accessed by the computing system.

The next act (act 820) includes the computing system causing the image generator to generate a plurality of images at multiple resolutions for each frame of a plurality of different frames from a stream of sequential frames, including a first set of images at a first resolution and a second set of images at a second resolution that is a relatively higher resolution than the first resolution. This may be accomplished by modifying the code of the image generator and/or by building a new image generator to process image data and generate the referenced output image sets at different resolutions.

In some instances, act 820 is implemented by causing the image generator to generate the first image(s) of the first image set and the corresponding second image(s) of the second image set simultaneously. In alternative embodiments, upon determining that the image generator can support a special rendering mode in which the image generator guarantees exact replication of frames for subsequent runs of gameplay or a simulation at different resolutions, such that frames of the subsequent runs can be exactly matched at their different resolution, the system may cause the image generator to generate the different image sets at the different resolutions asynchronously. To determine whether the image generator supports the special rendering mode, tests may be executed automatically. In some cases, to determine whether the image generator supports the special rendering mode, an operating system of a computing device executing the image generator is queried.

The different resolutions of the first and second image sets can be any resolution, wherein the second resolution is higher than the first resolution. In some embodiments, the first or second resolution is a resolution of 640×480 pixels, 1280×720 pixels, 1920×1080 pixels, 3840×2160 pixels (4k), 7680×4320 pixels (8k), or another resolution. It will be appreciated, however, that these are only a few examples of different resolutions that could be used, as there are almost infinite resolutions that could be used in the disclosed embodiments.

Next, the system generates a training data set for training a super-resolution model (act 830) by pairing the first and second image sets into unique image pairings in which each unique image pairing in the training data set comprises (i) a first image of a unique frame of the plurality of frames at the first resolution and (ii) a corresponding second image of the unique frame at a second resolution that is higher than the first resolution.

In some instances, this includes supplementing the training data set with supplemental image processing data associated with rendering the first set of images (i.e., the low-resolution images) corresponding to the plurality of different frames. This supplemental image processing data may be used as inputs for the super-resolution model image processing algorithms. The supplemental image processing data may comprise, for example, motion vector data corresponding to the rendering of the low-resolution images, jittered image data corresponding to the rendering images and/or depth data corresponding to the rendering of the low-resolution images.

Additionally, the system may optionally downsample the second set of images (i.e., the high-resolution images) from the second resolution to a third resolution that is a relatively higher resolution than the first resolution and prior to pairing the first set of images with the second set of images into the unique image pairings of training data (act 840). In such scenarios, for example, each unique image pairing in the training data set will comprise (i) the first image of the unique frame of the plurality of frames at the first resolution and (ii) the corresponding second image of the unique frame at the third resolution that is higher than the first resolution but which is lower than the second resolution.

This optional implementation of generating a super high-resolution image that is down-sampled to a target resolution can be a particularly useful optimization to further expedite the training of the super-resolution models by providing training data that includes target high-resolution images that can be used to drive the super-resolution models to a desired threshold of convergence more quickly, as the downsampled high-resolution images more closely resemble the desired target outputs of the super-resolution models. When the models are applied to the training data set, they will modify the weights of the algorithms more appropriately to generate desired target outputs based on the low-resolution and supplemental image processing data inputs. In these instances, the second resolution may be at least double the third resolution (e.g., 8k vs 4k) and/or at least double the first resolution.

The final illustrated act (act 850) includes causing the super-resolution model to be applied to the training data set. As noted above, the super-resolution model comprises a neural network having weights that are applied to parameters of the model algorithms. The parameters used by the model algorithms are the input values of the low-resolution images (e.g., pixel intensity, pixel color, and pixel density, etc.). The weights applied to the parameters cause different values to have a more or less significant impact in the output values that are calculated by the model algorithms while upscaling images from a first resolution to a second resolution. Application of the training data set to the super-resolution model causes the super-resolution model to modify the weights based on differences between (i) the second image of each image pairing in the training data set with (ii) an upscaled output image of the corresponding first image of each image pairing in the training data set that is generated by the super-resolution model applying the image processing algorithms to the first image of each image pairing and, optionally, supplemental image processing data of the training data (if any).

This process will continue on a gradient decent, in some instances, until the model reaches a desired threshold of convergence between the model outputs (e.g., high-resolution outputs generated by upscaling the low-resolution images of the training data set image pairings) and the target model outputs (e.g., the high-resolution images of the training data set image pairings). Even more particularly, the desired threshold of convergence may be a predetermined value of deviation (e.g., less than 0.1%, less than 0.2%, less than 1%, less than 5% deviation) between measured image attributes in the model outputs and the target model outputs, such as may be measured by a comparison of PSNR (Peak Signal-to-Noise Ratio), MS-SSIM (Multi-scale Structural Similarity for Image Quality Assessment), or any other objective scale.

Figure 9:
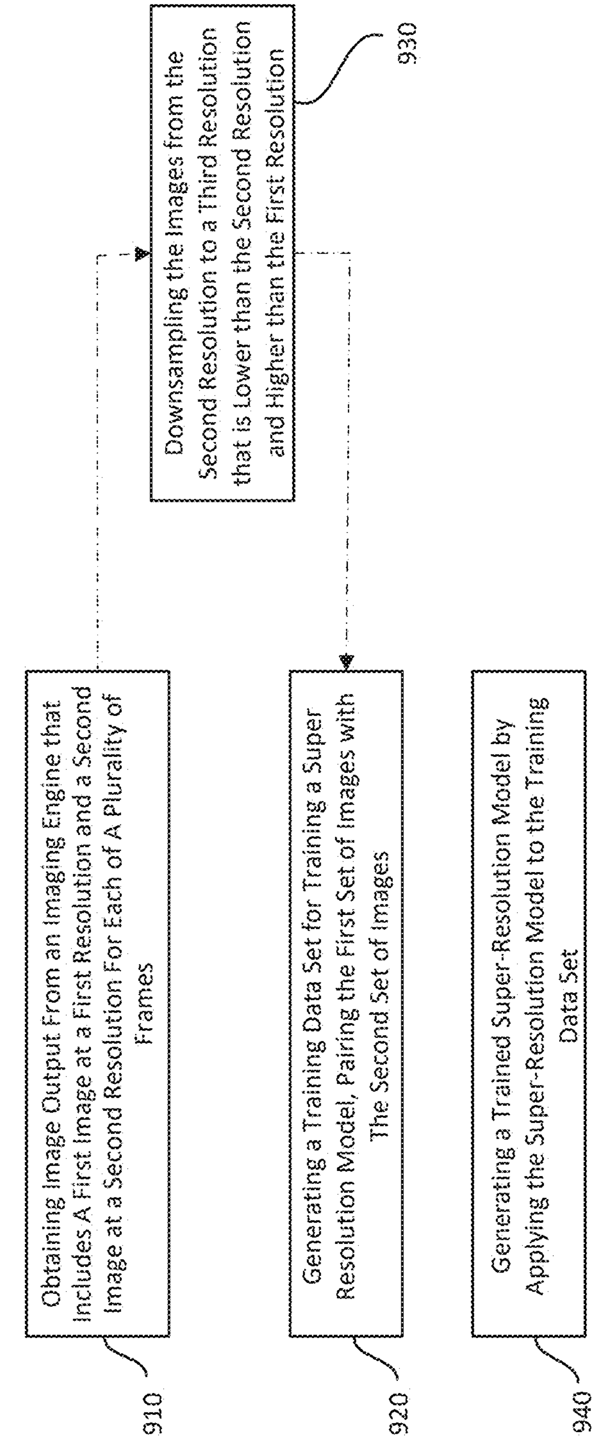
FIG. 9 illustrates an example of a flow diagram of acts associated with methods for generating training data sets and for generating trained super-resolution models by applying super-resolution models to the training data sets.

Attention is now directed to FIG. 9, which illustrates another flow diagram 900 that includes acts associated with methods for generating super-resolution training data and for generating a trained super-resolution model with the training data.

The acts of flow diagram 900 are implemented by a computing system having a processor and storage that stores computer-executable instructions that are executable by the processor to implement the functionality of the referenced acts.

The first illustrated act includes obtaining image output from an imaging engine (e.g., a gaming engine) that generates image output from processing image data (act 910) such as by rendering from a 3D model. As indicated above, the image output that is obtained comprises a first image at a first resolution and a second image at a second resolution for each frame from a set of frames selected from a sequential series of frames of the image data, wherein the second resolution is a higher resolution than the first resolution. This act may be performed similarly to the performance of acts 810 and 820, described above.

Next, the system generates a training data set for training a super-resolution model to generate upscaled images at the second resolution from input images at the first resolution by pairing the first image with the second image of each frame from the set of frames (act 920). This act may be performed similarly to the performance of act 830, described above. This may include, for example, processes for down sampling super high-resolution images (act 930), similar to act 840, described above.

Finally, the system generates a trained super-resolution model by applying the super-resolution model to the training data set (act 940). As mentioned previously, the weights of image processing algorithms are modified during training through backpropagation based on differences that are detected between (i) the target model outputs (e.g., the high-resolution image of each image pairing in the training data set with (ii) the actual model outputs (e.g., the corresponding upscaled output images generated from the low-resolution images in the training data set).

Notably, the super-resolution model is preferably trained with training data that corresponds to the specific styles of the images that the model is processing. Otherwise, the high-resolution images output by the super-resolution model will not converge with the desired output. For instance, if the model is trained on training data comprising pairs of low-resolution animation images at 1k (960×540 pixel resolution) and correlating high-resolution animation images at 2k (1920×1080 pixel resolution), that model will likely not be well-configured to generate photo-realistic high-resolution images at 4k (3840×2160 pixel resolution) based on photo-realistic images at a lower-resolution of 2k. Accordingly, to train a model to generate high-resolution images of a particular style from lower-resolution images of the same style or a different style during runtime, it is desirable to obtain training data that includes correlating matches of images having the same resolutions and styles that will be processed during runtime. The term "style" of an image is used to refer to characteristics of content depicted in an image such as texture, color, and motion of an image. More detail about style of an image is given below.

Using the techniques described above, it is sometimes possible to obtain such training data for a video game or other target product that is associated with images of a particular style by modifying an image generator that is used to generate images for the target product (e.g., video game) to utilize multiple output viewports (e.g., rendering targets) to generate low-resolution images along with correlating higher-resolution images of the target product (e.g., video game) during runtime.

Unfortunately, in some instances, such as when the video game is integrally packaged with the image generator, it can be very difficult or computationally prohibitive to modify the code of the image generator. It may also be difficult or prohibitive to use a separate image generator that could otherwise be modified to execute with the target product to generate correlating training pair images, as the target product may be locked or configured to execute with only the integrated image generator that it is packaged with. In these instances, it may not be possible to obtain training data directly from the target product. Because of this, it can be difficult to train a super-resolution model to generate high-resolution images having the unique style of the target product.

The following disclosure describes embodiments for obtaining and utilizing training data for training a super-resolution model to generate high-resolution images for a target product, based on the style of the target product images, even when it is not possible to modify an image generator to generate correlating images directly from the target product during execution of the target product.

As described in the disclosure related to FIGS. 10-12, some embodiments include utilizing a second image generator that is distinct from the image generator that is packaged with and integral with the target product. The second image generator is used to obtain correlating image pairings of low-resolution and high-resolution images of a product which is related to the target product since it has images of a similar or same style as the images of the target product. In these embodiments, the image pairings generated from the related product by the second image generator are used for training a super-resolution model to generate high-resolution images for a target product based on low-resolution images of the target product having a particular style during the execution of the target product by the first image generator.

The particular style of the images that are associated with target product that affect the presentation of the images during runtime can be referred to as style attributes. These style attributes affect the look and presentation of the images and include such things as color, texture, size, or font of text presented in the images, a type of anti-aliasing technique used to process the images (e.g., super sample anti-aliasing (SSAA), multi-sample anti-aliasing (MSAA), fast approximate anti-aliasing (FXAA), temporal anti-aliasing (TAA), subpixel morphological anti-aliasing (SMAA)), shading, lighting, physically-based rendering (PBR), dynamic range, depth of field, motion blur, ambient occlusion, or color grading. Additional style attributes can also include such things as artistic styles (e.g., cartoon, pixilated, non-pixilated, realism, expressive, classical, conceptual, contemporary, cubism, surrealism, minimalism, baroque, renaissance, an artists' personalized style, etc.).

When training a super-resolution model for performing super-resolution processing of low-resolution images generated during runtime of a target product to higher-resolution images, it is desirable to use training data of correlating image pairings having the same or similar style attributes as the images that will be processed for the target product during runtime.

Accordingly, it is desirable to identify sources of images having the same or similar style attributes as the target product images. Such sources can be referred to herein as related products inasmuch as they can be used to generate the same or similar style of images during runtime as the target product. Once related products are identified, they can be used with a modified image generator to generate correlating low-resolution and high-resolution image pairings (as generally described in reference to FIGS. 5-9) for creating and utilizing training data for training a super-resolution model to generate high-resolution images based on the same style of images as the lower-resolution target product images that are generated during runtime.

FIG. 10 illustrates an embodiment in which a target product 1000 is integrated with a first image generator 1010 (e.g., a gaming engine such as Unreal Engine™, Amazon Lumberyard™, CryEngine™, Unity, GameMaker: Studio, Incredibuild, or another gaming engine). The integrated image generator 1010 of the target product 1000 generates images of the target product at a first or low-resolution with a particular set of style attributes. As noted earlier, the style attributes can include any combination of resolution, framerate, color, texture, size, text font, anti-aliasing, shading, lighting, PBR, dynamic range, depth of field, motion blur, ambient occlusion, color grading, or artistic style.

In some instances, an image or video analyzer processes images of the target product that are generated by the first image generator to identify the style attributes of the target product. Additionally, or alternatively, a machine-learning image style identification model that is trained to identify image style attributes is applied to the target product images to identify the image style attributes of the target product. The identification of the style attributes may comprise identifying labels for different style attributes that are present within images of target product, as well as quantifying values for those style attributes (e.g., a percentage or degree in which the style attribute is determined to be present or applied within the image).

The image analyzer(s) and image style identification model(s) can also be used to identify the style attributes of the images of other related products (e.g., video games) that have the same or similar style attributes. This can be done, for example, by applying images of a plurality of different products to the image analyzer(s) and image style identification model(s) to identify images and corresponding related products that have the same set of one or more style attributes as the target product.

In some instances, the system will examine the style attributes of a plurality of different products to identify a related product that is determined to have the highest correlation of the same or similar style attributes as the target product relative to style attributes of other products that are examined in the plurality of different products.

The foregoing examples illustrate how a system can utilize a video analyzer to facilitate the identification and correlation of style attributes between the images of the target product and the images of related products (e.g., video games) that have the same or similar style attributes. It will also be appreciated that such identification and correlation can also be performed by a human and visual inspection to identify images that appear to the human to be similar. Identification processes can also be performed by a combination of human(s) and the referenced system components (e.g., image analyzer).

FIG. 10 also illustrates how a second image generator 1020 is separate from the first image generator 1010 is used to generate training data 1030 based on images of a related product 1040 for training super-resolution model that can be used as a trained super-resolution model to generate high-resolution image(s) for a target product based on the low-resolution images that are generated by the first image generator 1010 integrated with the target product during runtime.

In these embodiments, the second image generator 1020 is modified to generate the correlating images of training data, as described in reference to FIGS. 5-9, but wherein the image pairings are based on the related product images that have the same or similar style as the images of the target product.

FIG. 11 illustrates a flow diagram 1100 of a plurality of acts associated with methods for generating and using super-resolution training data to train a super-resolution model for processing images of a target product, wherein the training data is obtained from a modified image generator processing images of a related product having images that are of a same or similar style as the target product. One or more of the illustrated acts are implemented by a computing system having a processor and storage that stores computer-executable instructions that are executable by the processor to implement the functionality of the referenced acts.

The first illustrated act includes identifying a target product that is used during runtime to generate target images at a first resolution and for which the super-resolution model is to be trained to transform the target images from the first resolution to corresponding images at the second resolution, the target product being integrated with a first image generator that generates the target images for the target product at the first resolution during runtime of the target product (act 1110).

Next, the style attributes of the target images (act 1120) are identified. This can be done using a video or image analyzer, as mentioned above. This can be done using a machine-learning model trained to identify image attributes, as described above.

Next, the methods include evaluating a plurality of sample products to identify a related product comprising a training source product that is configured for use by a second image generator to generate output images at the first resolution with style attributes that are the same as or at least similar to the style attributes of the target product (act 1130).

Next, the methods include accessing an image generator (act 1140), such as a gaming engine or another type of image generator that is configured to generate images for the related product by processing image data of the related product and that outputs the generated images with style attributes that are the same or similar to the style attributes of the target images. The second image generator may be integrated into a part of the computing system or, alternatively, remotely accessed by the computing system.

Next, the second image generator is modified or otherwise caused to generate (i) output images at the first resolution as well as (ii) correlated output images having a second resolution that is different than the first resolution. This may be performed, for instance, by causing the second image generator to output images at different viewports simultaneously or contemporaneously during the execution of a game or other target product for which the second image generator is generating images.

A viewport is a rendering output target defined as a planar region (such as a rectangular or other shaped region) onto which an image is projected from a scene or a 3D model, such as used by a video game or other software application. A viewport has an associated virtual camera 3D position and orientation that is used by a renderer to render or project from the 3D model to the viewport. During a video game, a first player may have a first viewport computed from a first virtual camera 3D position and orientation, whereas a second player may have a second viewport computed from a second virtual camera 3D position and orientation. The viewports may be displayed on displays of the respective players. This is a non-exhaustive example since a single player may have more than one viewport, such as to switch between a first-person playing experience and a perspective view playing experience.

Modification of the second image generator may comprise configuring the second image generator to output images using at least two viewports and modifying the output resolutions of the viewports. As a result, the images generated for the two viewports depict the same content since they are projected or rendered from the same scene, even though they may have different camera angle perspectives, different aspect ratios, and/or different resolutions of the same scenes.

In some embodiments, the second image generator is modified so that the resolution of the images produced for the first viewport is different from the resolution of the images produced for the second viewport. The modification may comprise adjusting values of parameters in a renderer of the image generator so that the resolution is different for the different viewports. Modification of a game engine in this way, to produce images depicting the same content at different resolutions, is found to be particularly effective at producing training data for training super-resolution models, especially where the super-resolution models are to be used with the games or other software products that generate images of a similar style.

Conventional approaches where an output of the game engine is merely post-processed to generate images depicting the same content but at different resolutions is found to generate inferior training data for training the super-resolution models. By using the present technology to modify a game engine and automatically generate high-quality training data it is possible to rapidly train and deploy super-resolution models for particular software applications, such as particular video games, or other types of software applications.

In some instances, a super-resolution model may be deployed at a client device local to a display of an end user and low-resolution images obtained from a remote computing entity may be transmitted to the client device efficiently since they are low resolution. A super-resolution model is then operable to transform the lower-resolution images into new higher-resolution images, at the local client, by using the super-resolution model that is trained to compute the higher-resolution images from the received lower-resolution images.

Referring back to the training process used to train the super-resolution model with the foregoing functionality, it is noted that the model is trained with correlating low-resolution and high-resolution images from software application(s) having similar styles to the target software product. In particular, the aforementioned correlating output images are paired into a set of training data, wherein each of the pairings in the training data set comprise correlating low-resolution and relatively high-resolution images, as previously described (act 1160). As also previously noted, these image pairings may also be supplemented with additional correlating images of different resolutions and/or styles and supplemental information to augment the training data sets, as previously described.

As previously mentioned, the disclosed methods also include applying the super-resolution model to the set of training data to generate a trained super-resolution model. During this training, the weights of image processing algorithms incorporated into the super-resolution model are modified to reduce the differences between (i) the target output images (e.g., the high-resolution images in the training data set) with (ii) the actual output images generated by the model as a result of upscaling the low-resolution images the training data set.

As further shown, the methods may also include applying the trained super-resolution model to the same or new target images that are generated by the first image generator that is integrated with the target product (act 1180). In this manner, it is possible to cause the trained super-resolution model to transform low-resolution images output from the first image generator for the target product into high-resolution images during runtime of the target product.

In some instances, the method may also include applying the trained super-resolution model to images of a different target product to generate new high-resolution images and performing a regression analysis on the trained super-resolution model for regression. The regression analysis can be performed for the performance of the super-resolution model relative to the trained super-resolution model for generating the new high-resolution images for the different target product. Based on this regression analysis, the system will either persist (accept and save the modifications) or, alternatively, revert changes that were made to the super-resolution model when generating the trained super-resolution model. The system may revert the changes by deleting a modified version of the model resulting from the most recent training modifications and re-instantiating the model that existed before the most recent training modifications.

The system will persist the changes when it is determined regression to the super-resolution model has not exceeded a regression threshold. Alternatively, when it is determined the regression to the super-resolution model has exceeded the regression threshold then the changes will be reverted so the model returns to the state in which it existed prior to undergoing the changes that caused the regression (act 1190).

Thresholds for determining whether to revert or, alternatively, to persist (e.g., accept and save) the modifications to the model based on the training may include thresholds associated with a loss function for determining convergence of the super-resolution model during training. The decisions for persisting or reverting changes can also be made incrementally as the model is discretely trained on different batches of training data sets for image pairings of the related product(s). For instance, if the loss function of the model identifies a loss in convergence based on new training associated with applying the model to validation data corresponding to a new batch of training data associated with a related product above 1%, 2%, 5%, or another threshold relative to previous loss function calculations performed during training of the super-resolution model for processing images of the different target product, the system will determine to revert the training associated with at least the latest batch of one or more training data set(s) of image pairings for the related product. Alternatively, the system will persist the changes resulting from that training.

Notably, the regression analysis can also be performed prior to and/or subsequent to applying the trained super-resolution model to the target images generated by the first image generator (1180), as shown.

Additionally, after each training epoch, in which the model is applied to a full batch of a training data set, the system may iteratively perform the acts previously described, as shown by dashed arrows. This process will continue, in some instances, until the model reaches a desired threshold of convergence between the model outputs (e.g., high-resolution outputs generated by upscaling the low-resolution images of the training data set image pairings) and the target model outputs (e.g., the high-resolution images of the training data set image pairings). The indicator for convergence can be a percentage of similarity in an objective scale that measures the attributes and quality of the different images. These scales can include, for example, a PSNR and a MS-SSIM or other objective scale, as previously mentioned.

Although not shown, the methods may also include modifying the training data set by replacing the second set of images at the higher-resolution with a third set of images that comprise down-sampled images of the second set of images and corresponding acts for down-sampling the second set of images, as previously described.

FIG. 12 illustrates another flow-diagram of acts associated with related methods to those described with reference to FIG. 11. In this illustration, the acts 1220, 1230, 1260, 1270, 1280 and 1290 are the same as acts 1120, 1130, 1160, 1170, 1180 and 1190, and will not be restated inasmuch as they are the same. Act 1210 is also very similar to act 1110. However, rather than requiring the identification of a target product that includes an integrated image generator, act 1210 only requires the identification of the generated target images. These target images may be generated by an image generator integrated with a target product associated with the target images or by an image generator that is separate from the target product.

Likewise, act 1240 only requires the obtaining of output images at different resolutions for a related product, without requiring the accessing and modification or processing of the second image generator to generate the output images associated with the related product.

In this manner, the acts of training the super-resolution model can be performed by a model training system without explicitly requiring that system to perform the additional acts of causing the modification of the second image generator (acts 1140 and 1150) and without having to make the explicit identification of the target product used to generate the target images (act 1110). Instead, the system merely needs to obtain the target images (act 1210) and the output images for the related product that have the same style (act 1240) and thereafter train the model as described in reference to acts 1260, 1270, 1280 and 1290.

Then, after the model is trained, the system utilizing the model can transform new input images having a first resolution into higher-resolution output images based on the training and cause those images to be displayed at a local device or a remote device by transmitting the transformed images to a rendering engine for display. Notably, in some instances, the rendering of the high-resolution images occurs locally to a computing system that performs the method acts described above, including the training of the super-resolution model.

Additionally, the foregoing techniques that are described herein for generating training data sets of image pairings at different resolutions can also be applied to other types of image processing for generating and pairing different sets of images for sequences of frames processed by gaming engines and other image generators, wherein the different sets of images comprise different formats, styles, orientations, textures and/or other configurations and are paired into training data image pairings by frame, to thereby facilitate the training of machine learning models that are applied to the training data for improving the overall image processing performance of the models when performing corresponding image processing (e.g., changing size, changing orientation, cropping, stylizing, coloring, filtering, applying depths or textures, masking, or other image processing).

By way of example, in some instances, the act of obtaining output images 1240 includes generating correlating frames or image files of text characters having particular font types, sizes, coloring, shading and other style attributes. These correlating images will include a first set of text characters at a first resolution and/or style and a second set of the same text characters at a second and different resolution and/or style, wherein first set of text characters at the first resolution and/or style is the same as the resolution and style of text presented within the target images.

The disclosed techniques can help overcome many of the foregoing problems associated with obtaining training data. In particular, by causing a gaming engine or another imaging engine to generate two different image sets at different resolutions for the same plurality of frames, it is possible to generate very high quantities of training data at a relatively very low computational cost, particularly as compared to conventional techniques. This is also particularly helpful for obtaining training data that is germane to the final end-use scenarios where the super-resolution models will be used, e.g., gaming environments. This enables the models to reach a desired threshold of convergence more quickly with the target outputs of the gaming environments than would be possible when using training data that is generic and not specifically tailored to the gaming environment. This is also one benefit of supplementing the training data with the supplemental image processing data mentioned above (e.g., jittered image data, motion vector data, depth data).

Figure 13:
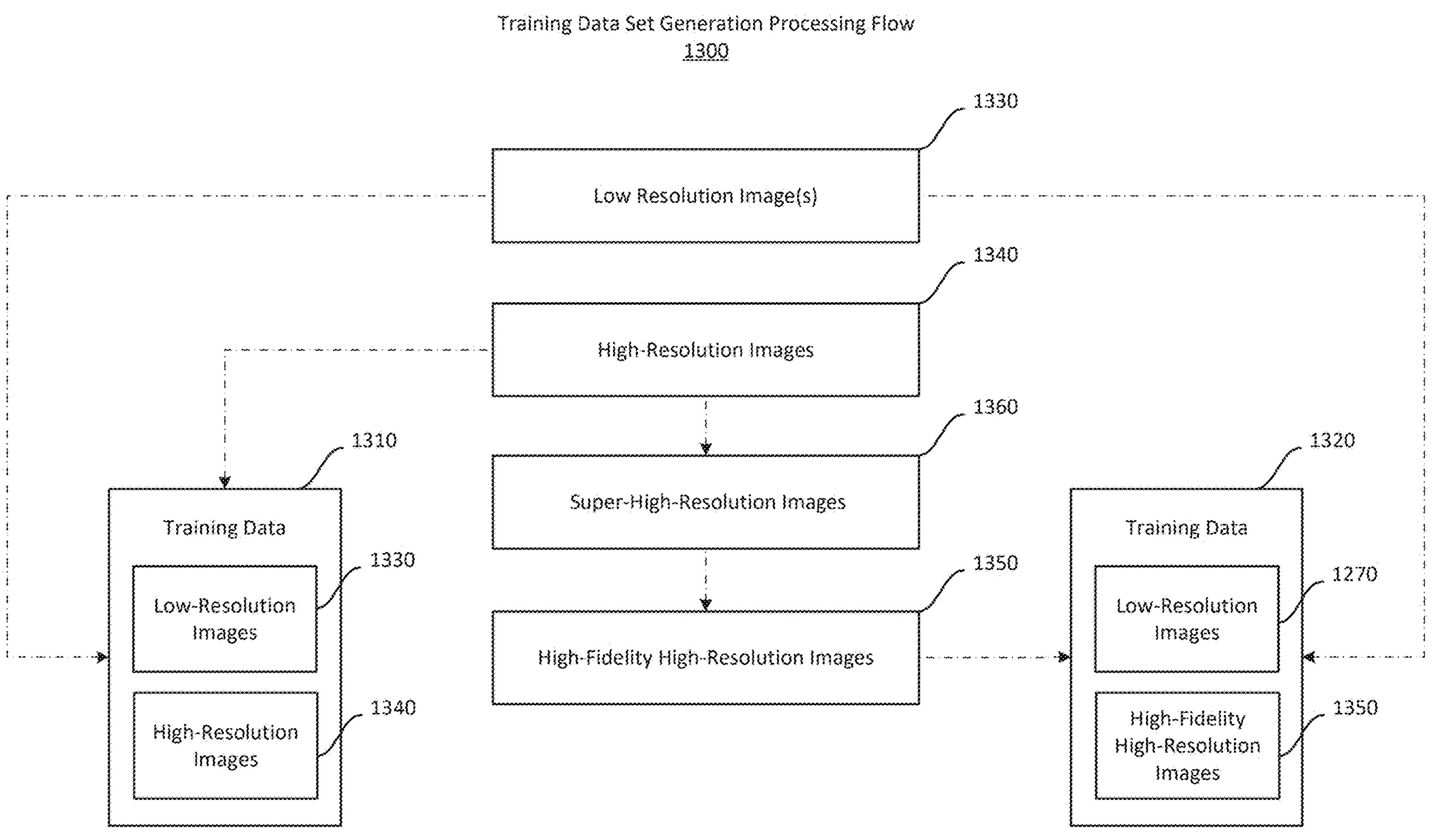
FIG. 13 illustrates an exemplary processing flow for generating a training data set comprising low-resolution images paired with correlating high-fidelity high-resolution images that are derived from an initial set of high-resolution images having a lower fidelity than the fidelity of the high-fidelity high-resolution images.
Figure 14:
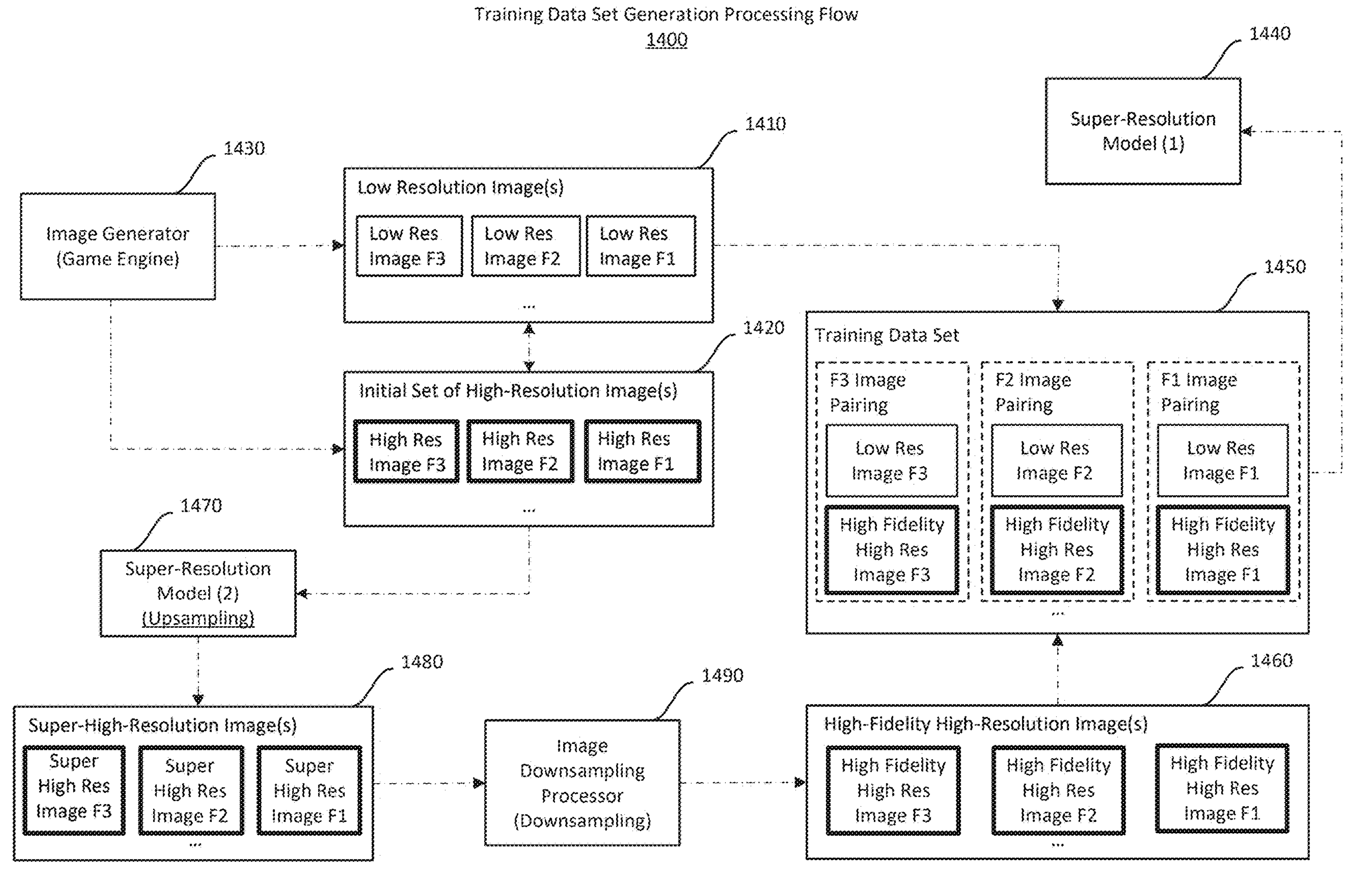
FIG. 14 illustrates another example of a processing flow associated with generating training data sets comprising low and high-resolution image pairings, wherein the high-resolution images in the training data sets are derived from other high-resolution images having a lower fidelity than the fidelity of the high-fidelity high-resolution images.
Figure 15:
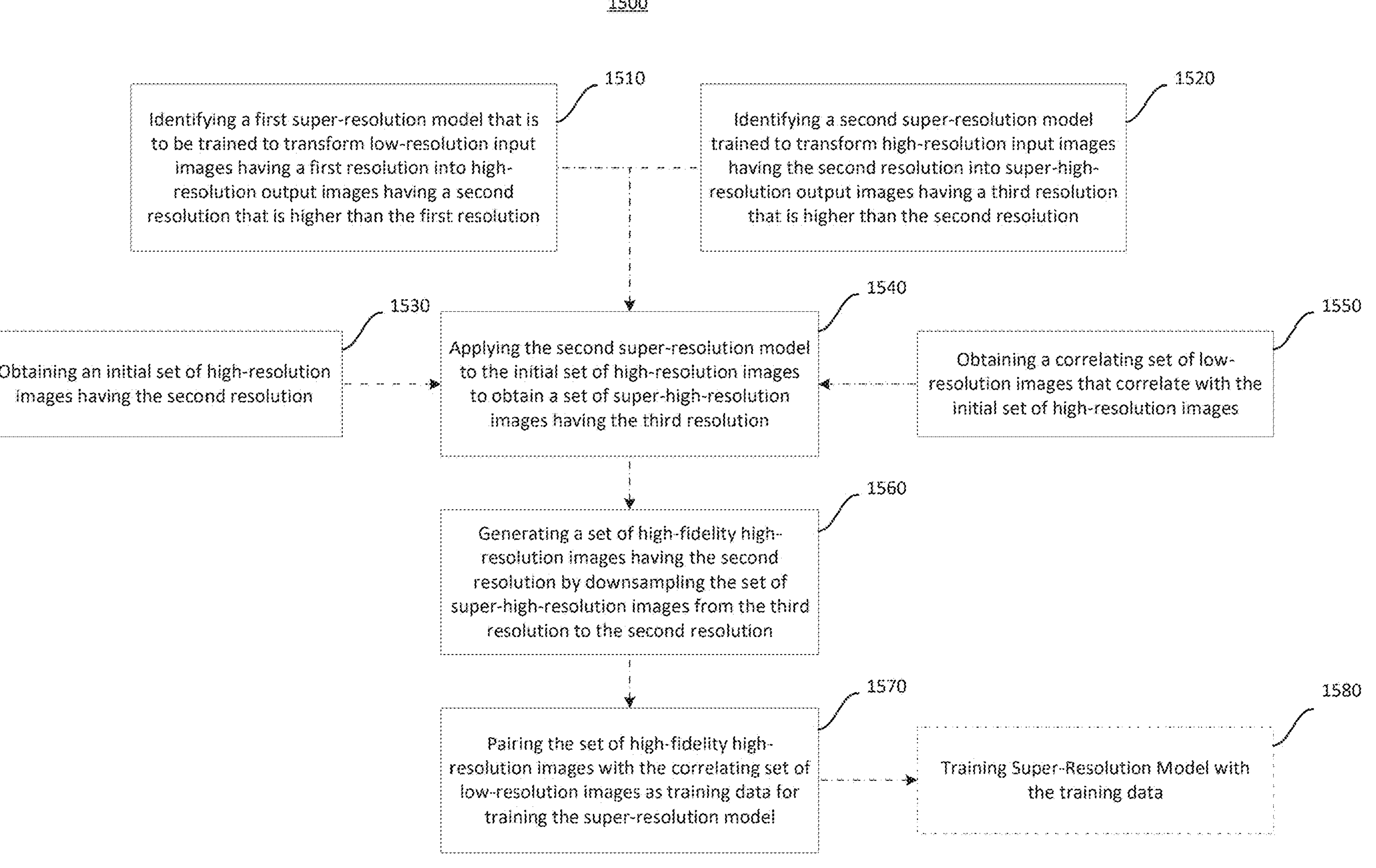
FIG. 15 illustrates another example of a flow diagram of acts associated with methods for generating training data sets and for generating trained super-resolution models by applying super-resolution models to the training data sets.

Attention is now directed to FIGS. 13-15, which illustrate additional exemplary embodiments for generating training data comprising low-resolution images paired with correlating high-resolution images, including many of the same processes as described above. But, in these embodiments, the high-resolution images contained in the training data have undergone operations to improve their fidelity relative to the fidelity of the initial set of high-resolution images that they are derived from.

FIG. 13 illustrates a processing flow 1300 for generating training data sets, such as, training data 1310 and training data 1320, both of which are based on the same underlying low-resolution images 1330 and high-resolution images 1340. But, the high-resolution images of the second set of training data 1320 (i.e., high-fidelity high-resolution images 1350) have a higher fidelity than the underlying high-resolution images 1340 from which they are derived. For this reason, they are referred to herein as "high-fidelity high-resolution images."

With regard to the term fidelity, it is noted that this is a relative term and that there are different objective and subjective methodologies that can be used for quantifying image fidelity. These methodologies include pixel-by-pixel comparison, feature vector comparison, structural similarity index (SSIM), peak signal-to-noise ratio (PSNR), Fréchet Inception Distance (FID), Manhattan Norm or Zero Norm, etc.

For the referenced images (e.g., low-resolution images 1330, high-resolution images 1340 and high-fidelity high-resolution images 1350), the fidelity scoring methodologies generally quantify how well the referenced images reproduce the details and quality of the original vector graphics that were rasterized into the raster representations of the original vector graphics.

Notably, when vector images are rasterized, the curved and triangular shapes defined by the vector graphics must be represented by square pixels. The higher the resolution an image has, the more pixels it uses to represent the underlying vector graphics. Even with millions of pixels, however, it is still impossible for the square pixels to precisely replicate the curves and triangle shapes defined by the images' underlying vector graphics. Aliasing artifacts that result from the rasterization processes can manifest as noticeably jagged edges in the resultant images. Sometimes, anti-aliasing techniques can be used to smooth the jagged edges by altering the coloring of the pixels rendered along the edges of the image shapes. This can help improve the fidelity of a raster image.

Another technique that has been found to improve the fidelity of an image is to downsample the image from a higher-resolution image that contains more pixels and more pixel data into an image at a lower resolution containing a blended and reduced set of pixels. In the downsampled image, the pixel attributes from a larger quantity of pixels are blended in a way that helps to smooth the edges of the image shapes and in a way that more accurately reproduces the details and quality of the original vector graphics that were impacted by the rasterizing of the original vector graphics. Such a downsampled image will have a higher fidelity to the original vector graphics than an image that is natively generated at the same resolution without being downsampled to that final resolution.

Techniques for obtaining and downsampling super-high-resolution images to generate the high-fidelity high-resolution images used in the training data are described herein. As shown in FIG. 13, and as will be described in more detail with reference to the illustrations of FIGS. 14-15, the high-fidelity high-resolution images 1330 paired with correlating low-resolution images 1330 in training data (e.g., training data 1320) are generated by first obtaining an initial set of high-resolution images 1340 and then upscaling those high-resolution images 1340 into super-high-resolution images 1360. This process can be performed by a super-resolution model trained to upscale high-resolution images (e.g., 2k, 4k or other high-resolution images) into super-high-resolution images (e.g., 4k, 8k, 16k).

Notably, the resolution of the super-high-resolution images 1340 can be any resolution that is greater than the resolution of the high-resolution images 1330 and the resolution of the high-resolution images 1330 is greater than the resolution of the low-resolution images. In some instances, super-high-resolution images 1340 is a resolution that is at least twice as great as the resolution of the high-resolution images 1330 and the resolution of the high-resolution images is at least twice as great as the resolution of the low-resolution images 1330.

After generating the super-high-resolution images 1360 from the initial set of high-resolution images 1340, the super-high-resolution images 1360 are downsampled into the high-fidelity high-resolution images 1350. As previously noted, the high-fidelity high-resolution images 1350 have a higher fidelity than the high-resolution images 1340 from which they were initially derived. Accordingly, by pairing the high-fidelity high-resolution images 1350 with the correlating low-resolution images 1330 into training data 1320, it is possible to provide a set of training data that is enhanced or improved relative to the training data 1310 for training a super-resolution model to transform input images at the low-resolution into output images with improved fidelity at the high-resolution.

These processes and benefits will be clarified further with reference to the training data set generation processing flow 1400 of FIG. 14. As shown, an initial set of low-resolution images 1410 and high-resolution images 1420 can be obtained from an image generator 1430 (e.g., a game engine that is modified to generate correlating pairs of images for different frames of a game (shown as images F1, F2, F3, etc.) and which are output at different viewports of the modified game engine, as previously described).

Alternatively, the image generator 1430 can be configured to output only a single set of either the low-resolution images 1410 or, the high-resolution images 1420. In these instances, if the initial set of images obtained are the high-resolution images 1420, then the low-resolution images 1410 can be generated by downsampling the initial set of high-resolution images 1420. Likewise, if only the low-resolution images 1410 are initially obtained, the high-resolution images 1420 can be generated by upsampling the low-resolution images 1410. Image resolution-modifying models, such as the previously disclosed super-resolution models can be used to make these transformations after being trained to make such image transformations.

In some instances, the initial set of high-resolution images is obtained by transforming yet another different set of images (not shown) having a fourth resolution that is different than the first resolution of the correlating low-resolution images, and that is different than the second resolution of the high-resolution images, and that is also different than a third resolution of super-high-resolution images (discussed below), that are derived from the high-resolution images. In these instances, the initial set of high-resolution images can be obtained by upsampling or downsampling the different set of images to the desired resolution for the initial set of high-resolution images.

Regardless of how the initial sets of correlating low-resolution images 1410 and high-resolution images 1420 are obtained, they can be combined into training data for training super-resolution models, such as super-resolution model 1440 to transform input images at the relatively lower resolution of the low-resolution images 1410 into output images at the relatively higher-resolution of the high-resolution images 1420 (as previously described in reference to FIGS. 1-13).

In the current embodiment, the low-resolution images 1410 can also be paired with high-fidelity high-resolution images 1460, which are derived from and have higher fidelity than the initial set of high-resolution images 1420 (as previously described), into training data 1450 for training the super-resolution model 1440 to transform input images at the relatively lower-resolution into output images at the relatively higher-resolution.

The high-fidelity high-resolution images 1460 can be generated by first generating an intermediary set of super-high resolution images 1480 by applying a super-resolution model 1470 to the initial set of high-resolution images 1420. This super-resolution model 1470 may include many convolution layers (e.g., hundreds or even thousands) which would not make this super-resolution model 1470 practical for upscaling images during the runtime of a game, for example, as this type of intense processing would be very computationally expensive and would be a significant burden on the processors of the game (e.g., game engine). This would cause the game being executed to be very laggy and even though the output images may be very high-quality, they may not be appreciated in view of the resulting poor performance of the game.

One benefit of generating and utilizing training data according to the current embodiment is that it facilitates embodiments in which a user can benefit from high-resolution images during runtime (e.g., when a game is being executed by a game engine) without negatively impacting the performance of the game engine. Typically, the performance of a game engine is negatively impacted during gameplay when the game engine is required to generate the images at a very high resolution. However, by offloading the processing required to render the high-resolution images to another component, such as super-resolution model 1440, the game engine can be set to output low-resolution images that have a minimal processing burden on the game engine.

The super-resolution model 1440 is trained to transform the low-resolution images into the desired high-resolution images, such that the transformation of the low-resolution images into the high-resolution images during runtime can be performed very inexpensively and efficiently.

To improve the performance of the super-resolution model 1440 and the fidelity of the high-resolution output images that are produced by the super-resolution model 1440, it is desirable to provide training data 1450 to the super-resolution model 1440 that includes high-fidelity high-resolution images 1460.

The high-fidelity high-resolution images 1460 can be generated by downsampling super-high-resolution images 1470 that are produced by applying a super-resolution model 1470 to the corresponding initial set of high-resolution images 1420.

The super-resolution model 1470 is trained to upsample or otherwise transform the initial set of high-resolution images 1420 and includes numerous convolution layers and/or processes (e.g., nearest neighbor interpolation, bilinear interpolation, cubic interpolation, and/or other upsampling techniques) that enable the super-resolution model 1470 to perform the referenced upsampling operations.

In some instances, the super-resolution model 1470 upsamples the initial set of high-resolution images 1420 to a resolution (e.g., 8k, 16k) that is at least double the resolution of the initial set of high-resolution images 1420 (e.g., 2k, 4k, 8k).

These upsampling operations can add details and textures to the image that improve the fidelity of the super-high-resolution images relative to the high-resolution images from which they were derived. While these operations can be slow and costly to implement during runtime of a game, they do not negatively impact gameplay when they are implemented independently from gameplay.

After the super-high-resolution images 1480 are obtained, they are downsampled by an image downsampling processor 1490 to generate the high-fidelity high-resolution images 1460 a target resolution (e.g., a resolution that the super-resolution model 1440 is to be trained to transform images into). In some instances, the target resolution is a resolution of the high-resolution images 1420. In other instances, the target resolution is higher or lower than the resolution of the high-resolution images 1420.

The downsampling processor may comprise a model that is trained to perform the downsampling operations with one or more known downsampling techniques (e.g., mipmapping, box sampling, gaussian downsampling, subsampling, anti-aliasing, decimation, and/or other downsampling techniques)

During the downsampling operations, the resolution of the images is reduced (e.g., by removing pixels from the image), while still incorporating the pixel information used by the higher-resolution images into the blended and/or remaining set of pixels. By performing the downsampling of the super-high-resolution images it is possible to generate a derived set of high-fidelity high-resolution images 1460 that have a higher fidelity than the initial set of high-resolution images 1420 from which they are derived.

Attention is now directed to FIG. 15, which illustrates a flow diagram 1500 of acts associated with the disclosed methods and functionality described above. These acts may be implemented by a computing system having one or more hardware processor(s) and stored computer-executable instructions that are executable by the hardware processor(s) to implement the disclosed functionality.

As shown, the acts include an act (act 1510) of a computing system identifying a super-resolution model (e.g., super-resolution model 1440) to be trained to transform low-resolution input images having a first resolution into high-resolution output images having a second resolution that is higher than the first resolution.

The computing system also identifies a second super-resolution model (e.g., super-resolution model 1470) that is already trained to transform high-resolution input images having the second resolution into super-high-resolution images having a third resolution that is higher than the second resolution (act 1520).

The computing system also obtains an initial set of high-resolution images (e.g., high-resolution images 1420) having the second resolution (act 1530) and a correlating set of low-resolution images (e.g., low-resolution images 1410) having the first resolution that is smaller than the second resolution. Several embodiments have been described above for obtaining these correlating pairings of low-resolution and high-resolution images.

Next, according to the current embodiment, the computing system causes the second super-resolution model to be applied to the initial set of high-resolution images to generate and obtain a corresponding set of super-high-resolution images (e.g., super-high-resolution images 1480) having the third resolution (act 1540).

Next, the computing system generates a corresponding set of high-fidelity high-resolution images (e.g., high-fidelity high-resolution images 1460) having the second resolution by downsampling the set of super-high-resolution images from the third resolution to the second resolution (act 1560).

It will also be appreciated that the scope of the current invention is not limited to any particular magnitude of image fidelity for the high-fidelity high-resolution images, particularly since fidelity is a relative term and there are so many different ways to measure fidelity. Instead, the disclosed embodiments described in reference to FIGS. 13-15 merely require that the fidelity of the high-fidelity high-resolution images is greater than the fidelity of the high-resolution images from which the high-fidelity high-resolution images are derived.

The next illustrated act is the pairing of the high-fidelity high-resolution images with the correlating set of low-resolution images as training data (e.g., training data 1450) that can be used for training the super-resolution model (act 1580). Notably, training the super-resolution model (e.g., super-resolution model 1440) with this training data that includes the high-fidelity high-resolution images, enables the super-resolution model to transform low-resolution images into high-fidelity high-resolution images during runtime (e.g., during gameplay and execution of a game by a game engine), wherein the high-fidelity high-resolution images have a higher fidelity than the high-resolution images would otherwise be generated by the game engine if the game engine were set to output the high-resolution images during gameplay. This also enables the game engine to be used with the super-resolution model to render high-fidelity high-resolution images during gameplay (even when the game engine is set to output low-resolution images during gameplay) and without imposing significant image processing costs on the game engine.

It will be appreciated that the disclosed methods may be practiced by a computer system comprising a computer including one or more processors and computer-readable media such as computer memory. In particular, the computer memory may store computer-executable instructions that when executed by one or more processors cause various functions to be performed, such as the acts recited in the embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), programmable read-only memory (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers (PCs), desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating training data for training a super-resolution model, the method comprising:

identifying a first super-resolution model that is to be trained to transform low-resolution input images having a first resolution into high-resolution output images having a second resolution that is higher than the first resolution;

identifying a second super-resolution model trained to transform high-resolution input images having the second resolution into super-high-resolution output images having a third resolution that is higher than the second resolution;

obtaining an initial set of high-resolution images having the second resolution;

obtaining a correlating set of low-resolution images that correlate with the initial set of high-resolution images;

applying the second super-resolution model to the initial set of high-resolution images to obtain a set of super-high-resolution images having the third resolution;

generating a set of high-fidelity high-resolution images having the second resolution by downsampling the set of super-high-resolution images from the third resolution to the second resolution, the set of high-fidelity high-resolution images having a second image fidelity that is greater than a first image fidelity of the initial set of high-resolution images; and pairing the set of high-fidelity high-resolution images with the correlating set of low-resolution images as training data for training the super-resolution model.

2. The method of claim 1, wherein the method further includes applying the first super-resolution model to the training data to generate a trained super-resolution model that is configured to transform new input images having the first resolution into new output images having the second resolution with the second image fidelity.

3. The method of claim 2, wherein the method further includes applying anti-aliasing to the high-fidelity high-resolution images prior to applying the first super-resolution model to the training data.

4. The method of claim 1, wherein the correlating set of low-resolution images having the first resolution is obtained by downsampling the initial set of high-resolution images from the second resolution to the first resolution.

5. The method of claim 1, the correlating set of low-resolution images having the first resolution is obtained from an image generator that generates the initial set of high-resolution images.

6. The method of claim 5, wherein the image generator is a game engine and wherein the initial set of high-resolution images and the correlating set of low-resolution images are obtained from different viewports of the game engine.

7. The method of claim 1, wherein the initial set of high-resolution images having the second resolution is obtained by transforming a different set of images having a fourth resolution into the initial set of high-resolution images having the second resolution.

8. The method of claim 7, wherein the different set of images having the fourth resolution is transformed into the initial set of high-resolution images having the second resolution by downsampling the different set of images from the fourth resolution to the second resolution.

9. The method of claim 7, wherein the different set of images having the fourth resolution is transformed into the initial set of high-resolution images having the second resolution by upsampling the different set of images from the fourth resolution to the second resolution.

10. The method of claim 1, wherein the third resolution is at least double the second resolution.

11. A computing system comprising:

a hardware processing system comprising a hardware processor; and one or more storage devices storing executable instructions that are executed by the hardware processing system for causing the computing system to perform operations comprising:

identifying a first super-resolution model that is to be trained to transform low-resolution input images having a first resolution into high-resolution output images having a second resolution that is higher than the first resolution;

identifying a second super-resolution model trained to transform high-resolution input images having the second resolution into super-high-resolution output images having a third resolution that is higher than the second resolution;

obtaining an initial set of high-resolution images having the second resolution;

obtaining a correlating set of low-resolution images that correlate with the initial set of high-resolution images;

applying the second super-resolution model to the initial set of high-resolution images to obtain a set of super-high-resolution images having the third resolution;

generating a set of high-fidelity high-resolution images having the second resolution by downsampling the set of super-high-resolution images from the third resolution to the second resolution, the set of high-fidelity high-resolution images having a second image fidelity that is greater than a first image fidelity of the initial set of high-resolution images; and pairing the set of high-fidelity high-resolution images with the correlating set of low-resolution images as training data for training the super-resolution model.

12. The computing system of claim 11, wherein the operations further include applying the first super-resolution model to the training data to generate a trained super-resolution model that is configured to transform new input images having the first resolution into new output images having the second resolution with the second image fidelity.

13. The computing system of claim 12, wherein the operations further include applying anti-aliasing to the high-fidelity high-resolution images prior to applying the first super-resolution model to the training data.

14. The computing system of claim 11, wherein the correlating set of low-resolution images having the first resolution is obtained by downsampling the initial set of high-resolution images from the second resolution to the first resolution.

15. The computing system of claim 11, the correlating set of low-resolution images having the first resolution is obtained from an image generator that generates the initial set of high-resolution images.

16. The computing system of claim 15, wherein the image generator is a game engine and wherein the initial set of high-resolution images and the correlating set of low-resolution images are obtained from different viewports of the game engine.

17. The computing system of claim 11, wherein the initial set of high-resolution images having the second resolution is obtained by transforming a different set of images having a fourth resolution into the initial set of high-resolution images having the second resolution.

18. The computing system of claim 17, wherein the different set of images having the fourth resolution is transformed into the initial set of high-resolution images having the second resolution by downsampling the different set of images from the fourth resolution to the second resolution.

19. The computing system of claim 17, wherein the different set of images having the fourth resolution is transformed into the initial set of high-resolution images having the second resolution by upsampling the different set of images from the fourth resolution to the second resolution.

20. The computing system of claim 11, wherein the third resolution is at least double the second resolution.

* * * * *